United States Patent [19]
Kozuka et al.

[11] Patent Number: 5,818,435
[45] Date of Patent: Oct. 6, 1998

[54] MULTIMEDIA DATA PRESENTATION DEVICE AND EDITING DEVICE WITH AUTOMATIC DEFAULT SELECTION OF SCENES

[75] Inventors: Masayuki Kozuka, Neyagawa, Japan; Paul Fletcher; Gary McGill, both of Edinburgh, England; Yasutaka Yamada, Hirakata; Koichiro Endo, Osaka, both of Japan; Mark Rogers; Phil Cooke, both of Edinburgh, England; Mitsuhiro Inoue, Osaka, Japan

[73] Assignee: Matsushita Electric Indusrial, Osaka-fu, Japan

[21] Appl. No.: 489,344

[22] Filed: Jun. 12, 1995

[30] Foreign Application Priority Data

Jun. 10, 1994 [JP] Japan .................................. 6-129077
Jun. 13, 1994 [JP] Japan .................................. 6-130020
Jun. 13, 1994 [JP] Japan .................................. 6-130024

[51] Int. Cl.$^6$ .................................................. G06T 15/00
[52] U.S. Cl. ......................................................... 345/302
[58] Field of Search .................................... 395/806, 807, 395/762, 173–175, 326–332, 347–350, 352–354, 356, 357, 960–963

[56] References Cited

U.S. PATENT DOCUMENTS 5,182,677  1/1993  Kizu et al. ................................. 386/55
5,339,393  8/1994  Duffy et al. ............................... 395/328

OTHER PUBLICATIONS

Macromedia Director for the Macintosh, Overview Manual, Chapter 3, 1991.

Ogawa et al. "Scenario–Based Hypermedia: A Model and a System" (1990).

*Primary Examiner*—Almis R. Jankus
*Attorney, Agent, or Firm*—Price, Gess & Ubell

[57] ABSTRACT

The object of the present invention is to provide a multimedia presentation device which, by executing a setting process for an information block, which is an address of an automatic branch, by means of an automatic discharge process for a button which stores the branch address, enables the user to understand how a branch address was selected. Command discharge condition information is stored the information block reproduction means for managing buttons which are automatically discharged at an end of a reproduction period or other such time, so that by executing a branch process by automatically selecting a button in place of a user operation, then even if there has been no user selection of a branch address before the end of the reproduction period, a branch address can be automatically selected and, by showing on the display the button which for manual selection stores a link to the same branch address, the data can be presented in a form which can readily understood by the user.

23 Claims, 34 Drawing Sheets

EXAMPLE OF INFORMATION PRESENTATION SCREEN IN REPRODUCTION SECTOR 1

EXAMPLE OF INFORMATION PRESENTATION SCREEN IN REPRODUCTION SECTOR 2

EXAMPLE DISPLAY OF REPRODUCTION PERIODS OF EACH MEDIA IN INFORMATION BLOCK 1

MOVING BETWEEN INFORMATION BLOCKS
AFTER USER SELECTION

AUTOMATIC MOVEMENT BETWEEN INFORMATION
BLOCKS IN ABSENCE OF USER SELECTION

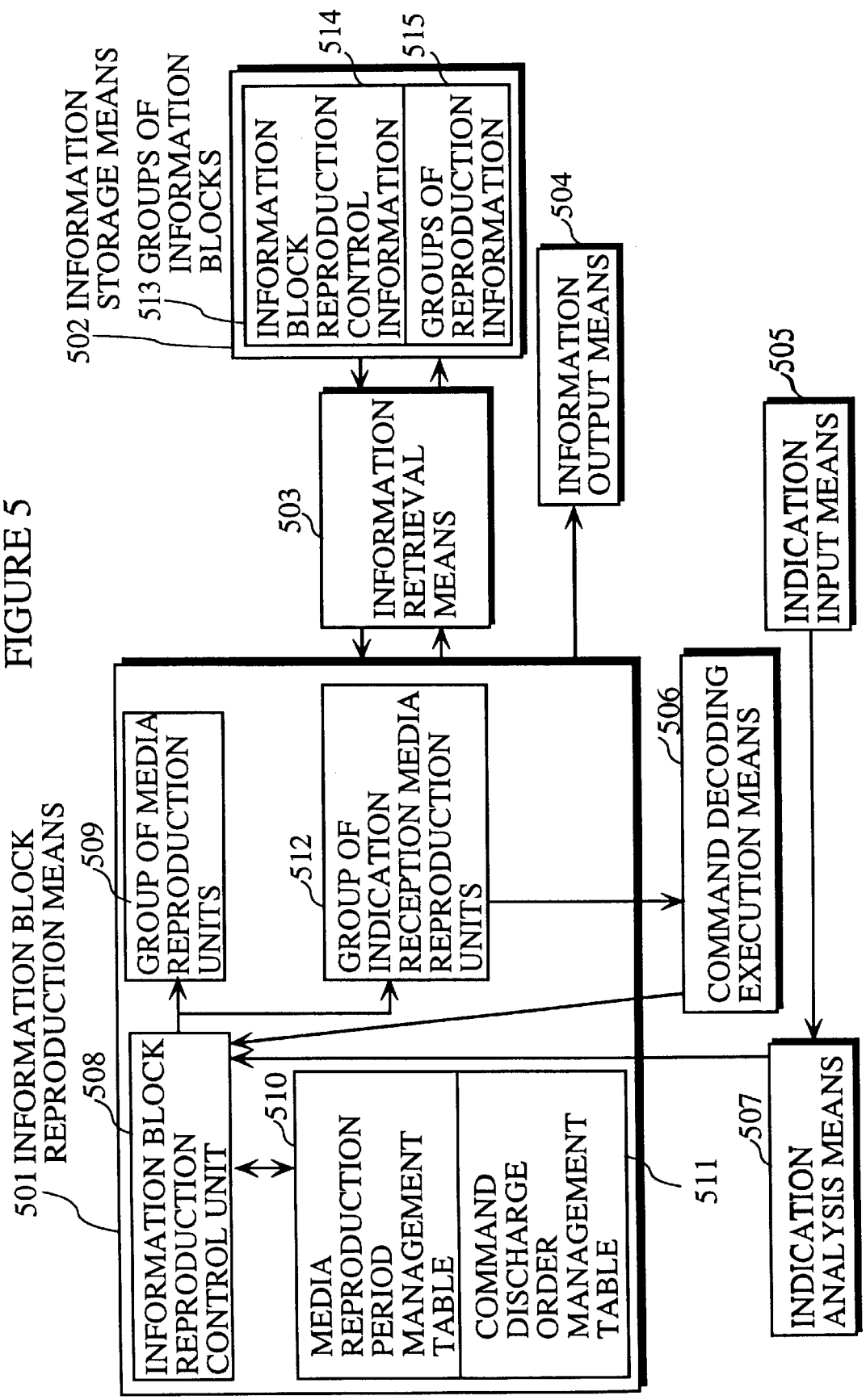

FLOW OF INFORMATION BLOCKS

CONTROL FLOW OF INFORMATION BLOCKS

| SCENE NAME | LINK RELATIONSHIP | LINK TYPE | LINKED SCENE NAME |
|---|---|---|---|
| SCENE 1 | SIBLING | NORMAL | SCENE 2 |
| SCENE 2 | SIBLING | NORMAL | SCENE 3 |
| SCENE 3 | PARENT−CHILD | NORMAL | SCENE 31 |
|  | PARENT−CHILD | POP UP | SCENE 32 |

| SCENE NAME | LINK RELATIONSHIP | LINK TYPE | LINKED SCENE NAME |
|---|---|---|---|
| SCENE 1 | SIBLING | NORMAL | SCENE 2 |
| SCENE 2 | SIBLING | NORMAL | SCENE 3 |
| SCENE 2 | PARENT-CHILD | NORMAL | SCENE 21 |
| SCENE 21 | PARENT-CHILD | NORMAL | SCENE 211 |
| SCENE 21 | PARENT-CHILD | NORMAL | SCENE 212 |
| SCENE 211 | SIBLING | NORMAL | SCENE 212 |
| SCENE 3 | PARENT-CHILD | NORMAL | SCENE 31 |
| SCENE 3 | PARENT-CHILD | NORMAL | SCENE 32 |
| SCENE 31 | SIBLING | NORMAL | SCENE 32 |

| SCENE NAME | LINK RELATIONSHIP | LINK TYPE | LINKED SCENE NAME |
|---|---|---|---|
| SCENE 1 | SIBLING | NORMAL | SCENE 3 |
| SCENE 1 | SIBLING | NORMAL | SCENE 2 |
| SCENE 3 | PARENT-CHILD | NORMAL | SCENE 31 |
| SCENE 3 | PARENT-CHILD | NORMAL | SCENE 32 |
| SCENE 31 | SIBLING | NORMAL | SCENE 32 |
| SCENE 2 | PARENT-CHILD | NORMAL | SCENE 21 |
| SCENE 21 | PARENT-CHILD | NORMAL | SCENE 211 |
| SCENE 21 | PARENT-CHILD | NORMAL | SCENE 212 |
| SCENE 211 | SIBLING | NORMAL | SCENE 212 |

| SCENE NAME | LINK RELATIONSHIP | LINK TYPE | LINKED SCENE NAME |
|---|---|---|---|
| SCENE 1 | SIBLING | NORMAL | SCENE 2 |
| SCENE 2 | SIBLING | NORMAL | SCENE 3 |
| SCENE 3 | PARENT-CHILD | NORMAL | SCENE 31 |
| SCENE 31 | PARENT-CHILD | NORMAL | SCENE 311 |
| SCENE 31 | PARENT-CHILD | NORMAL | SCENE 312 |
| SCENE 311 | SIBLING | NORMAL | SCENE 312 |

| SCENE NAME | LINK RELATIONSHIP | LINK TYPE | LINKED SCENE NAME |
|---|---|---|---|
| SCENE 1 | SIBLING | NORMAL | SCENE 2 |
| SCENE 2 | PARENT-CHILD | NORMAL | SCENE 3 |
| SCENE 3 | PARENT-CHILD | NORMAL | SCENE 31 |
| SCENE 31 | PARENT-CHILD | NORMAL | SCENE 311 |
| SCENE 31 | PARENT-CHILD | NORMAL | SCENE 312 |
| SCENE 311 | SIBLING | NORMAL | SCENE 312 |

OPERATION OF COMPOSITION EDITING
SCREEN GENERATION UNIT 13021

FIGURE 30(a)
PERIOD INFORMATION

| PERIOD NUMBER | PERIOD1 | PERIOD2 |
|---|---|---|
| PERIOD TIME | 15 | 20 |

FIGURE 30(b)
DATA INFORMATION

| CHANNEL NUMBER | 1 | 1 | 2 | 2 | 3 | |
|---|---|---|---|---|---|---|
| PERIOD NUMBER | 1 | 2 | 1 | 2 | 2 | |
| ADDRESS | a1 | a2 | a3 | a4 | a5 | |
| REPRODUCTION BASE TIME | 15 | 20 | 0 | 0 | 20 | |
| REMAINING TIME PROCESS NUMBER | 0 | 0 | 0 | 0 | 0 | |

FIGURE 30(c)
PERIOD INFORMATION

| PERIOD NUMBER | PERIOD1 | PERIOD2 |
|---|---|---|
| PERIOD TIME | 20 | 20 |

FIGURE 30(d)
DATA INFORMATION

| CHANNEL NUMBER | 1 | 1 | 2 | 2 | 3 | 3 |
|---|---|---|---|---|---|---|
| PERIOD NUMBER | 1 | 2 | 1 | 2 | 1 | 2 |
| ADDRESS | a1 | a2 | a3 | a4 | a9 | a5 |
| REPRODUCTION BASE TIME | 15 | 20 | 0 | 0 | 20 | 20 |
| REMAINING TIME PROCESS NUMBER | 0 | 0 | 0 | 0 | 0 | 0 |

FIGURE 31 (a)
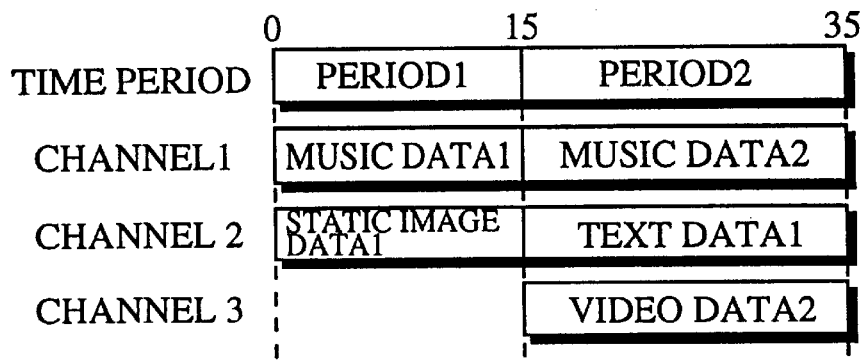
FIGURE 31 (b)
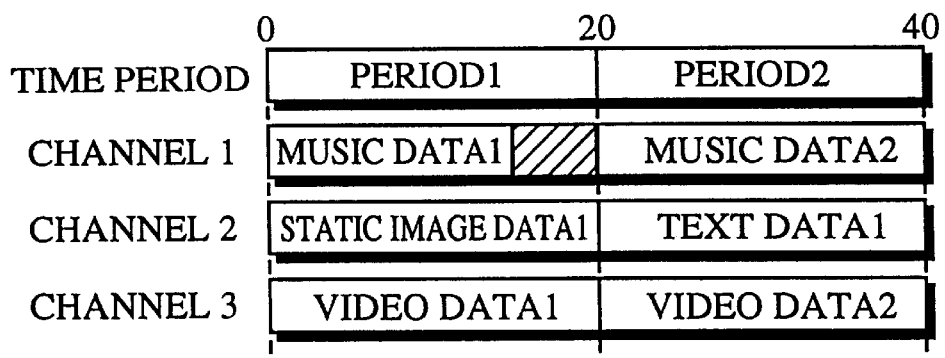
FIGURE 31 (c)
REMAINING TIME PROCESS TABLE
| REMAINING TIME PROCESS NUMBER | DISPLAY PATTERN | REPRODUCTION METHOD |
|---|---|---|
| 0 | | REPEAT FROM START |
| 1 | | NO OUTPUT |
| 2 | | PROLONG FINAL OUTPUT |

# MULTIMEDIA DATA PRESENTATION DEVICE AND EDITING DEVICE WITH AUTOMATIC DEFAULT SELECTION OF SCENES

BACKGROUND OF THE INVENTION

1. Field of the Invention

The present invention relates to a presentation device and a similar kind of multimedia data editing device which are capable of aurally and visually reproducing information recorded on electronic storage media, such as CD ROMs or IC cards, or information received from a communications network, and in particular to a presentation device and a similar kind of multimedia data editing device for which the data to be supplied is composed of multimedia data, with the user being able to interactively change the order in which the data is presented.

2. Prior Art

Developments in recent years have led to the production of computers which can handle multimedia data, including a great number of information presentation systems for supplying information such as electronic publications and electronic catalogs. As can been seen with the HyperCard system (US Apple Ltd. Trademark), there have been a great variety of developments in multimedia information reproduction techniques using cards, page-based hypertext, and hyper-media, with information presentation systems being developed based on such methods. For such information presentation techniques for graphic user interfaces, such as hypertext or hyper-media, it has been possible for users to give a branch commands for referencing information, stored so as to be corresponded to buttons, by merely positioning a pointing device controlled by an input device, such as a mouse, on a desired button.

Additionally, with information presentation systems such as US MacroMedia Ltd.'s "Director" or "Action", it has been possible to arrange a number of media in information blocks which have a specified information presentation time, so that when the reproduction of one information block is complete, following information blocks can be successively reproduced in a desired order.

For hypertext systems such as HyperCard, since it is not possible to indicate the reproduction time period in the information block, the display of an information block will continue until a button is selected. As a result, the user will be asked to select a button when there is the possibility of branching to a different information block. Conversely, with information reproduction systems such as US MacroMedia Ltd.'s "Director" or "Action", the reproduction period for each information block is set beforehand, so that once the period has elapsed, there will be an automatic transfer to another information block.

However, for the case of electronic publications and electronic catalogs, it is the desire of some users to change the current display to another image by means of a button operation, while other users prefer to have the display change automatically from one image to the next. Also, the same user may sometimes wish to change the current display to another image by means of a button operation and other times, for example when tired, have the screen change automatically without them making any operation.

As a result, there is demand for an information presentation device which can operate according to the wishes of a wide variety of users. Such a device can be said to be a presentation device which in addition to allowing the displayed image to be changed by means of a button operation, automatically proceeds to a following image when there is no button operation for a certain time period.

However, whilst there are no special problems if the reproduction device is to handle information such as electronic publications and electronic catalogs made up of information blocks which are interrelated so as to form a sequence, there are the following difficulties if the device is of a multi-level construction with a number of branch destinations which can be accessed when the displayed image changes due to a button operation.

If there is no button operation for a certain time, the device will branch to another destination and will retrieve and reproduce the information block at that address. However, since this branch address is decided without regard to a button operation, it can be difficult for the user to know what exactly is going on. Furthermore, even when the branch is selected out of the selection branch buttons by means of a button operation, there is no way for the user to confirm the selection branch which she or he selected.

Additionally, when a number of information blocks which are joined together in a series are selected by a branch selection button, it is easy to lose track of the position of the information block which is currently being reproduced and of the information block which one wishes to view, so that the user can literally "lose their way" inside the data.

The following is an explanation of the techniques used and the problems for multimedia data editing devices under the prior art.

Conventional multimedia data editing devices generate scenes composed of a combination of video, graphics, audio, text as information blocks. In order to edit the reproduction order of these information blocks, editing devices generate compressed images for each scene which are then rearranged according to their reproduction order and displayed. The user operates an input device such as a keyboard or a mouse and, by changing the reproduction order of the compressed images, can change the reproduction order information.

However for conventional devices, since a number of scene representation screens (previously referred to as compressed image of scenes) are listed according to one scene reproduction order which is used for editing, if the composition of the scene reproduction order becomes complex, such as when a number of scene reproduction orders are necessary, then it can be difficult to understand the relationship between scenes and the link composition, so that there are the problems of poor editing performance and incomprehensibility.

There are the additional drawbacks that when editing a scene being reproduced on the display, the user cannot know which other scenes have a link relationship with the scene being edited, and that there is the inconvenience that it is not possible for the user to know which scene is which when viewing the edited result.

Also, for conventional editing devices, there is the following problem when editing separate scenes. When the multimedia data which constitutes the scene includes a number of media, such as audio and video, which change with elapsed time, then there is no established method for defining a synchronization relationship between media whose reproduction time is different.

Methods which express the reproduction starting time and reproduction ending time for the separate media using a specialized language were used at the initial stage of development of multimedia, but for such techniques, there is the problem that it is difficult to understand the synchronization relationship between the different media during reproduction. As a result, in recent information reproduction systems such as US MacroMedia Ltd.'s "Director", the time axis is set as the horizontal axis of the screen, while a number of media are arranged in the vertical axis, with the reproduction period of each medium being displayed as a bar which is corresponded to the time axis. In such a system, the user can directly manipulate these time bars and so set the reproduction starting time and reproduction ending time for the separate media with reference to the synchronization relationship between a number of media during reproduction.

As an example of an editing operation for this kind of system, suppose during the initial 15 minute period the music data 1 and the static image 1 are reproduced. For the next 20 minutes, the music data 2, the text data 1 and the animated picture data 2 are reproduced. As a further editing operation, if the author wishes to add the video data 3 which has a reproduction time of 20 minutes to the initial music data 1 and static image 1, then the following processes become necessary.

(1) The reproduction starting time of the music data 1 and the static image 1 are synchronized and the video data 3 is set. However, the reproduction of the final five minutes of the video data 3 will overlap with the reproduction of the following music data 2, text data 1 and video data 2.

(2) The reproduction starting time of the music data 2, text data 1 and video data 2 are changed to the reproduction ending time of the video data 3. However, if it is desired to have the reproduction of the music data 1 and the static image 1 extended until the reproduction starting time of the music data 2, text data 1 and video data 2, then there will be a gap of five minutes in the sequence.

(3) The reproduction ending time of the music data 1 and the static image 1 are changed so as coincide with the reproduction time of the video data 3 of twenty minutes. However, in doing so it is no longer possible to know the reproduction base time for the reproduction of the music data 1 (in this case, fifteen minutes).

In this way, when performing consecutive synchronized reproduction of multimedia data on a number of channels, there has been a problem with conventional editing devices that when extending the reproduction time period of data whose reproduction time period is different to the reproduction time period of data on other channels, there have been synchronization slips between the channels for data preceding and following the extending data. Furthermore, correcting the synchronization between the data on channels preceding and following the extending data has led to synchronization slips between the end of the data reproduced so as to be synchronized to the extended data and the start of the reproduction of the preceding and following data. Furthermore, by changing the reproduction time it is no longer possible to know the reproduction base time.

SUMMARY OF THE INVENTION

Accordingly, it is the primary object of the present invention to provide a multimedia data presentation device which, visually displays which selection branch was selected when a branch is automatically discharged from an information block with a plurality of branch addresses, so as to be very user-friendly.

It is a secondary object of the present invention to provide a multimedia data editing device which is a device for editing a scene link composition, such composition being a combination of a number of linked scenes of multimedia data, in a way so that a user can easily comprehend the scene link composition and change it according to their wishes.

It is a further object of the present invention to provide a multimedia data editing device which, by managing the editing information so that reproduction time is used as period information, avoids synchronization slips between data on different channels which comes before or after data with a different reproduction time to data on other channels which is inserted during editing, and also prevents the user from losing track of the reproduction base time of data whose reproduction time is changed when such data information with a different reproduction time is added.

In order to achieve the primary object described above, the present invention is a multimedia presentation device which is characterized by including command discharge condition management information in the information block reproduction means for managing buttons which are automatically discharged, such as at the end of a reproduction period, and by having a construction so that a branching process between information blocks is executed by means of discharge of the buttons.

By means of this construction, then even if the user fails to specify a branch address before the expiration of a reproduction period, a branch address can be automatically selected and, by displaying the automatic selection of the button media which stores the link to the selected branch address in the same way as if it were manually selected, can display the data in a format which is readily understandable by the user.

The secondary object of the present invention is achieved by an editing device which enables a user to interactively change a presentation order of presentation information which is made up of multimedia data, said editing device comprising: a scene link management information storage unit for storing scene link management information made up of link relation information showing which scenes are connected and link type information; an editing information temporary storage unit for retrieving the scene link management information from the scene link management information storage unit and temporarily storing the scene link management information as mid-editing scene link management information; an input unit for receiving an editing request input from an input device, such as a mouse; an editing control unit for converting the mid-editing scene link management information stored by the editing information temporary storage unit, based on a type one editing request input from the input unit, and for converting the scene link management information stored by the storage means to the mid-editing scene link management information stored by editing information temporary storage unit, based on a type two editing request input from the input unit; a scene link composition screen generation unit for retrieving the mid-editing scene link management information from the editing information temporary storage unit, and, in addition to generating a scene figure for expressing a scene as a simplified figure and a scene link line figure for expressing a link between scenes as a line figure, for deciding, based on the mid-editing scene link management information, a format of the scene figure and the scene link line figure and a display position of the scene figure and the scene link line figure, thereby generating a scene link composition screen in which at least one scene figure is connected by a scene link line figure; and a display output unit for outputting the scene link composition screen generated by the scene link composition screen generation unit to an output device.

By means of the above construction, then links between scenes and the link composition can be displayed, even when the construction features a number of scene reproduction orders or complicated reproduction orders, so that the editing capability and reliability of the device are improved over those of contemporary devices.

Also, the scene link management information may be a table which records, for any given scene, scene identifiers for any scenes which are linked to said given scene and information which shows that a relationship linking scenes is one of a parent-child and a sibling relationship, and the editing control unit may include a rewriting unit for rewriting at least one of an appropriate scene identifier and an appropriate relationship in the mid-editing scene link management information stored by the editing information temporary storage unit, in accordance with a type one editing request input.

By means of the above construction, the editing information which can be changed by means of an editing request input is only the scene identifiers of the scenes to which a given scene is linked and the nature of the relationship, so that if a scene with a sub level is edited the sub levels of the given scene will not be affected. Therefore the user can execute editing operations on any level without the risk of losing the inter-level relationships between scenes.

Also, the scene link composition screen generation unit may include: a judgement unit for referencing the mid-editing scene link management information in the editing information temporary storage unit and judging what kind of relationship a scene to be drawn has with a scene which has already been drawn; and a drawing position deciding unit for deciding a drawing position of a simplified figure for a next scene by setting coordinates of a next drawing position so that the scene to be drawn is displaced at a fixed distance with regard to the scene already drawn in one of the main axes, when a judgement result is a sibling relationship, and by setting coordinates of a next drawing position so that the scene to be drawn is displaced at a fixed distance with regard to the scene already drawn in both of the main axes, when a judgement result is a parent-child relationship.

Also, the scene link management information storage unit, in addition to storing the link relation information showing which scenes are connected and the link type information, may also store scene level information which describes inter-level relationships between scenes connected on different levels, and the scene link composition screen generation unit may further include: a scene detection unit for detecting scenes which have a sub level, out of the mid-editing scene link management information retrieved from the editing information temporary storage unit; and a scene representation figure generation unit for generating, for a detected scene with a sub level, a scene representation figure which is to be displayed in place of all scenes on sub levels.

Also, the scene link composition screen generation unit may further include: a drawing selection unit for having the scene representation figure generation unit process, when the scene detection unit detects a number of identical scenes with a sub level, all but one of the identical scenes, and for having one remaining scene processed by the judgement unit and drawing position deciding unit so that the one remaining scene is drawn with all scenes on sub levels represented by simplified figures; and an identification mark generation unit for displaying scenes out of the identical scenes with a sub level whose sub level is represented by a scene representation figure with different identification marks to a scene out of the identical scenes with a sub level whose sub levels are represented by simplified figures, with an identification mark being positioned next to each respective scene.

By means of the above construction, the device can represent groups of scenes using scene reproduction figures for sub-level compositions, which prevents the display from becoming overcrowded, helps prevent the user from making errors which would destroy the links between scenes, even when there a complex inter-level relationships between scenes and a same scene appears in different places in the same composition.

Also, the input unit may receive a selection indication from the user for selecting which of the identical scenes having a sub level is to be displayed with all of its sub levels represented by simplified figures; and the scene link composition screen generation unit may further include a drawing selection control unit for controlling the drawing selection unit, according to a selection indication received by the input unit, so as to always display a scene with a sub level indicated by the selection indication with all of its sub levels represented by simplified figures, and for having other identical scenes displayed with their sub levels represented by scene representation figures.

Also the editing device may further include: a scene information storage unit for storing source data made up of video, audio, graphics, text and suchlike and scene composition information for composing a scene out of the source data; and a scene editing screen generation unit for retrieving scene composition information from the scene information storage unit via the editing information temporary storage unit and, in addition to generating a scene editing screen for editing scenes, for retrieving the mid-editing scene link management information from the editing information temporary storage unit and for generating a list screen of scenes which are linked to a present screen, based on the mid-editing scene link management information, before overwriting the list screen on one area of the scene editing screen.

By means of the above construction, since a scene editing screen and a scene link composition screen are corresponded with each other, it is most simple for the user to know when editing scenes which scenes are linked to the scene being edited.

The following construction is also possible.

An editing device which enables a user to interactively change a presentation order of presentation information which is made up of multimedia data, said editing device comprising: a scene information storage unit for storing scene information including source data, made up of video, audio, graphics, text and suchlike, and scene composition information for composing a scene out of the source data; a scene link management information storage unit for storing scene link management information made up of link relation information showing which scenes are connected and link type information, as well as scene level information for describing an inter-level relationship for scenes linked on different levels; an editing information temporary storage unit for retrieving the scene link management information from the scene link management information storage unit and temporarily storing the scene link management information as mid-editing scene link management information; an input unit for receiving an editing request input from an input device, such as one of a mouse and a keyboard; an editing control unit for converting the mid-editing scene link management information stored by the editing information temporary storage unit based on a type one editing request input from the input unit, and for converting the scene link management information stored by the storage unit to the mid-editing scene link management information stored by editing information temporary storage unit, based on a type two editing request input from the input unit; a scene information retrieval unit for retrieving the scene information from the scene information storage unit and the scene link management information from the editing information temporary storage unit; a scene reproduction screen generation unit for generating a scene reproduction screen for reproducing a scene, based on the scene information retrieved by scene information retrieval unit; a scene link composition screen generation unit for generating a scene figure for expressing a scene as a simplified figure and a scene link line figure for expressing a link between scenes as a line figure, based on the scene link management information retrieved by the scene information retrieval unit and for deciding, based on the scene link management information, a format of the scene figure and the scene link line figure and a display position of the scene figure and the scene link line figure, as well as expressing any scenes which have a sub level as scene representation figures and storing a display status for each of the scenes which have a sub level, so that when a same scene with a sub level is simultaneously displayed several times, sub levels belonging to one of the same scenes are displayed and the remaining same scenes have their sub levels represented by scene representation figures, thereby generating a scene link composition screen in which at least one scene figure is connected by a scene link line figure, at a same time retrieving information for a scene to be reproduced from the scene information retrieval unit and, based on the scene link composition screen, visually changing a scene figure and a scene link line figure corresponding to the scene to be reproduced by the scene reproduction screen generation unit; and display output unit for outputting the scene link composition screen generated by the scene link composition screen generation unit and the scene reproduction screen generated by the scene reproduction screen generation device to an output device.

The further object of the present invention is achieved by an editing device for editing a combination of multimedia data, such as video, static images, text and sound, to be reproduced simultaneously, the editing device comprising: a data storage unit for storing the multimedia data and data related information; a data retrieval unit for retrieving one of the multimedia data and data related information, such as reproduction time, from the data storage means; a period information storage unit for storing time period information specifying a reproduction time for each reproduction of a piece of multimedia data; a data information storage unit for storing a channel number, a period number and an address showing a position where a piece of data is stored in the data storage unit; a data indication unit for indicating a piece of data, out of the multimedia data stored by the data storage unit, which is to be used as editing object data; a time period indication unit for indicating a reproduction time period of the newly indicated editing object data; a channel indication unit for indicating a channel for reproduction of the newly indicated editing object data; an editing information control unit for storing in the data information storage unit the reproduction time period indicated by the time period indication unit, the channel indicated by the channel indication unit and an address of the editing object data indicated by the data indication unit, for retrieving a data reproduction time for the editing object data indicated by the data indication unit from the data retrieval unit and a period time of a time period indicated by the period indication unit from the period information storage unit, before comparing the data reproduction time and the period time, and for converting, when the data reproduction time is longer than the period time, an appropriate period time in the period information storage unit to a value of the data reproduction time, in other cases leaving the period time as it is; editing information display unit for processing information for visually displaying editing information for the multimedia data, based on a content of the period information storage unit and on a content of the data information storage unit, when a content of one of the period information storage unit and the data information storage unit is updated by the editing information management unit; reproduction indication input unit for inputting an indication for reproducing edited multimedia data; a reproduction control unit for retrieving, once a reproduction indication is inputted into the reproduction indication input unit, appropriate data from the data storage means based on an address stored by the data information storage unit, in accordance with the period information stored by the period information storage unit; an image data display unit for processing image data to be displayed in the data retrieved by the reproduction control unit; and an audio data output unit for processing audio data to be outputted in the data retrieved by the reproduction control unit.

The data information storage unit may store, in addition to a channel number, a period number, and an address showing a position where data is stored in the data storage unit, a reproduction base time which is a necessary time for one reproduction of one piece of data, the editing information management unit may store the data reproduction time, which is one piece of the data related information retrieved by the data retrieval unit, as the reproduction base time in the data information storage unit, the editing information display unit may process editing information for display by changing, when a reproduction base time in the data information storage unit is set at a fixed value beforehand, a period of time of an appropriate time period to a reproduction time, and the reproduction control unit may control, when a reproduction base time in the data information storage means is set to a fixed value beforehand, a change of a period of time for an appropriate time period to the reproduction time.

The data information storage unit may also store a remaining time process number, the editing information control means may store a remaining time process number, which is one piece of the data related information retrieved by the data retrieval means, in the data information storage means, the editing information display means may process information for display using a display pattern corresponding to a remaining time process number which is set beforehand for a display area for any remaining time after expiration of a reproduction base time during a period time, the image data display unit may process image data using a predetermined method in accordance with a remaining time process number as a reproduction process for any remaining time after expiration of a reproduction base time during a period of time, and the audio data output means may process audio data using a predetermined method in accordance with a remaining time process number as a reproduction process for any remaining time after expiration of a reproduction base time during a period of time.

By means of the above construction, the reproduction base time of data is displayed so that the user will not lose track of this time, even if she or he changes the reproduction time.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 5 is a block diagram showing the construction of the multimedia data presentation device in the second embodiment of the present invention;

FIGS. 20 (a), (b), (c), (d) are tables for showing the changes in the scene link management information during editing;

FIGS. 30(a), 30(b), 30(c), and 30(d) are a series of tables showing examples of the period information and data information before and after the addition of the media data;

FIG. 31(a), 31(b) are figures showing the change of the multimedia data with time;

FIG. 31(c) is a table showing the remaining processing time numbers with their corresponding reproduction processes;

DESCRIPTION OF THE PREFERRED EMBODIMENTS

First Embodiment

Figure 1:
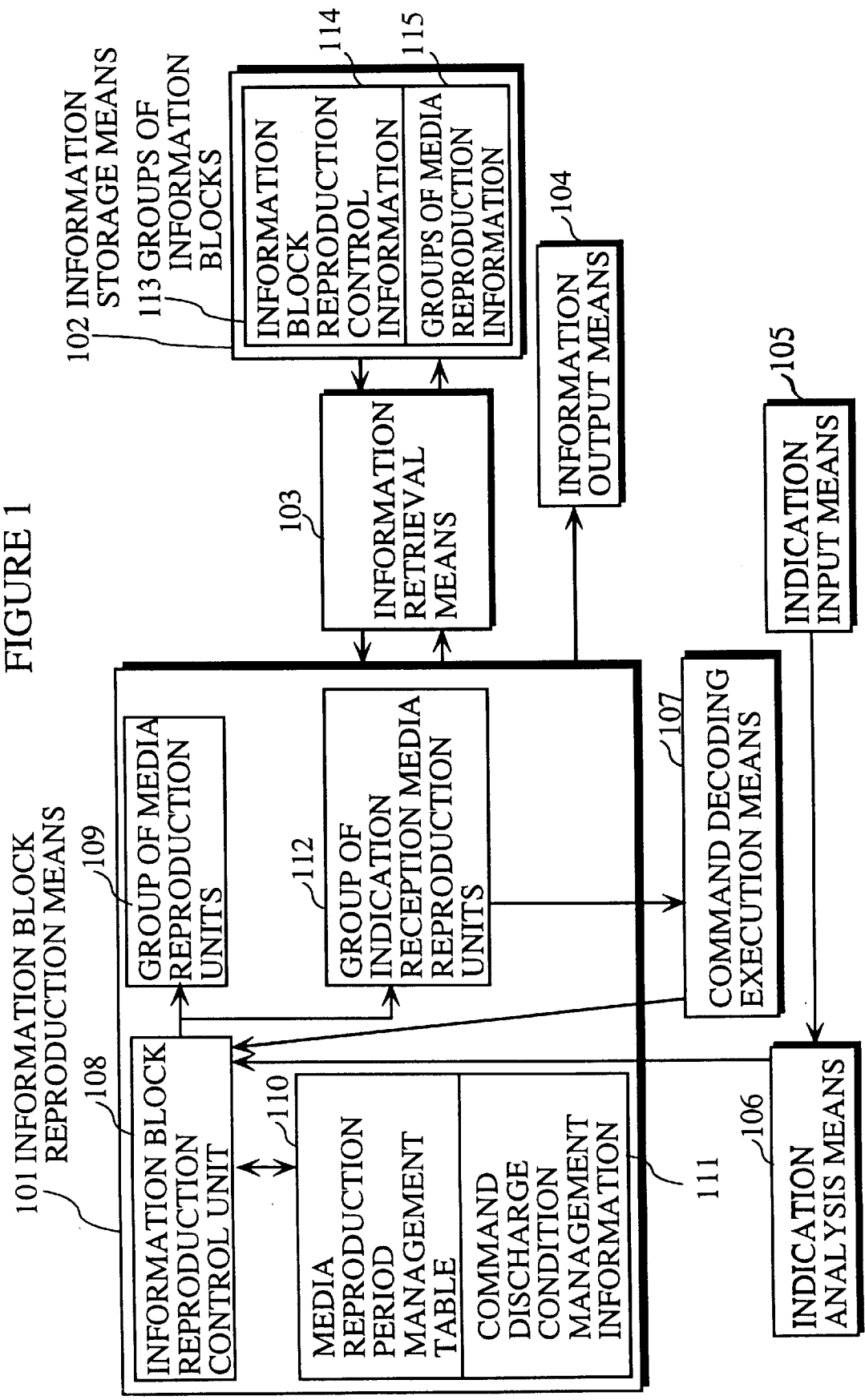
FIG. 1 is a block diagram showing the construction of the multimedia data presentation device in the first embodiment of the present invention.
Figure 2:
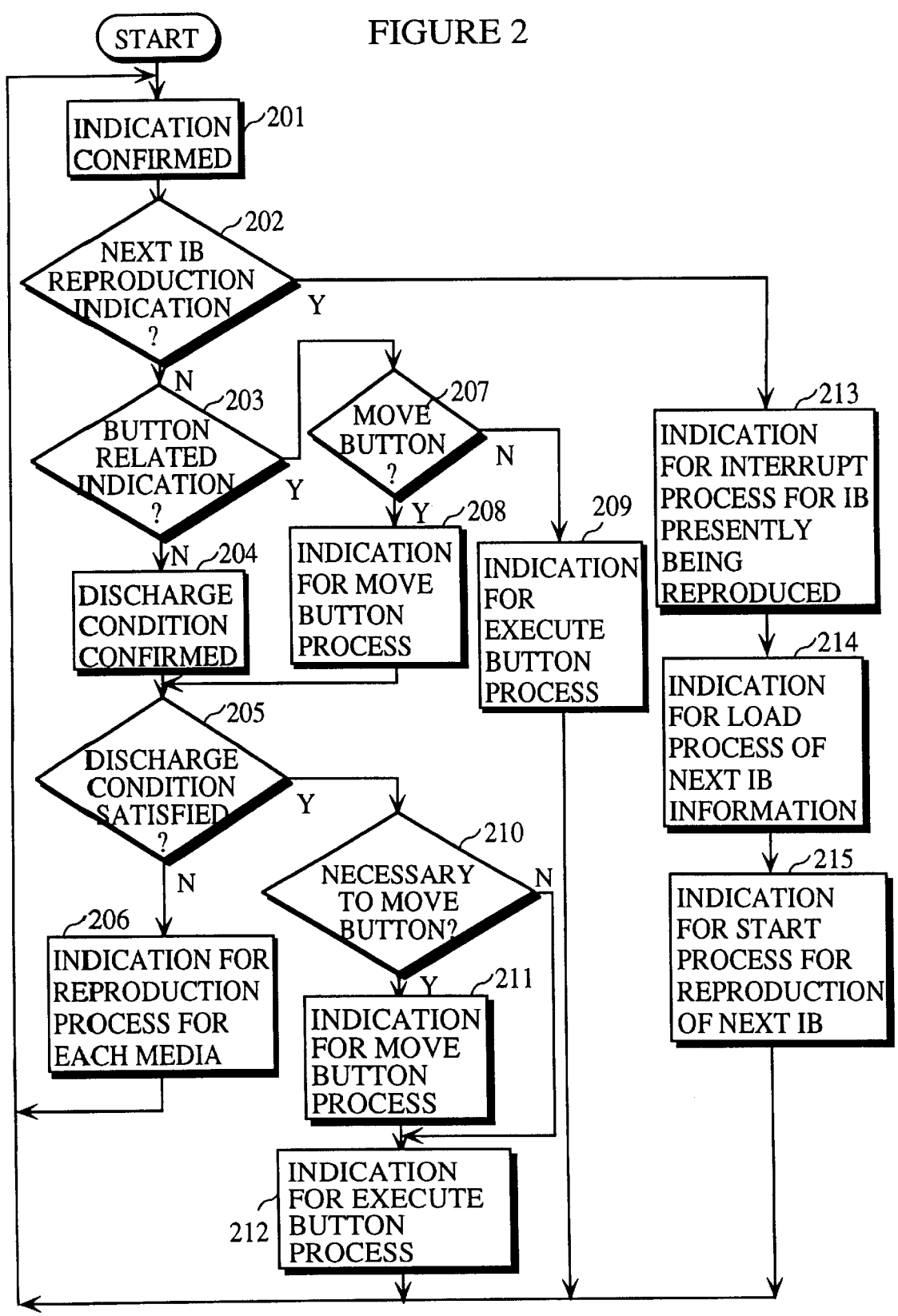
FIG. 2 is a flowchart for the operation of the information block reproduction means in the first embodiment.
Figure 3A:
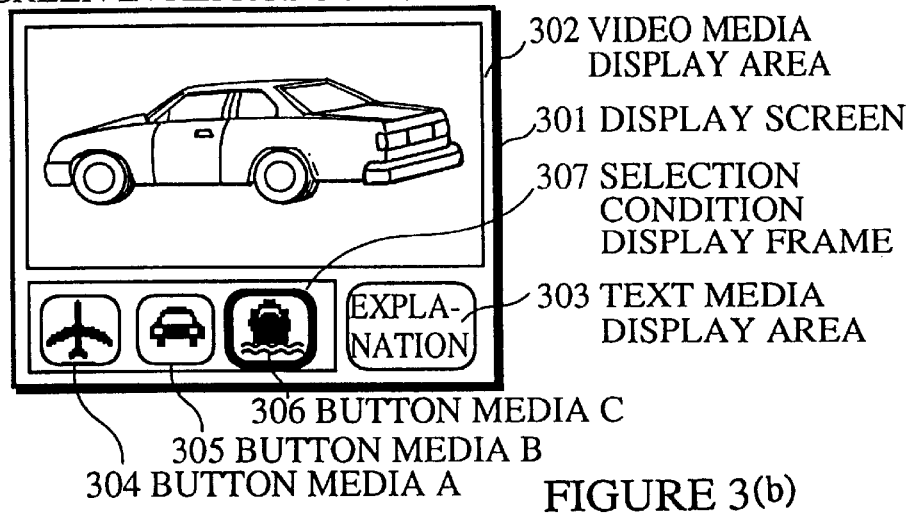
FIGS. 3(a), 3(b) and 3(c) are drawings showing example displays of an information block on a screen and the changes in the state of each of the media with regard to reproduction time.
Figure 3B:
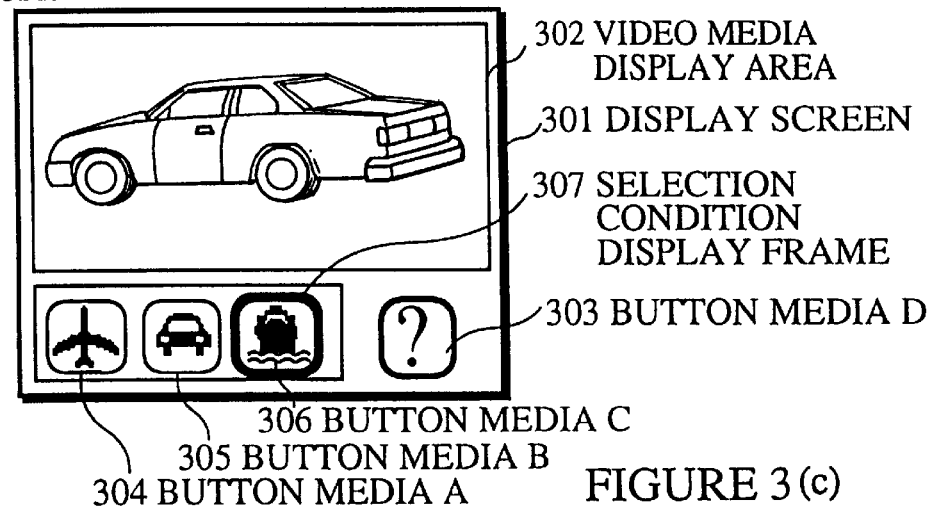
Figure 3C:
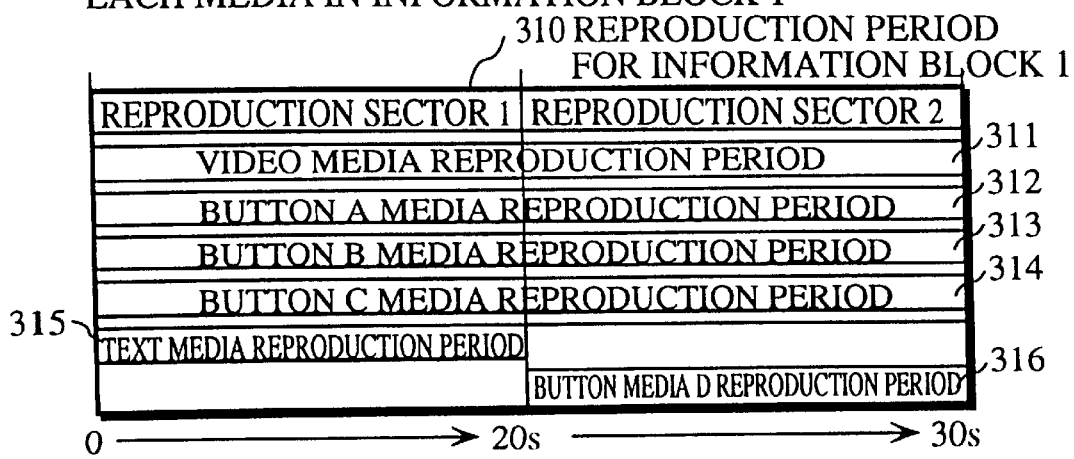
Figure 4:
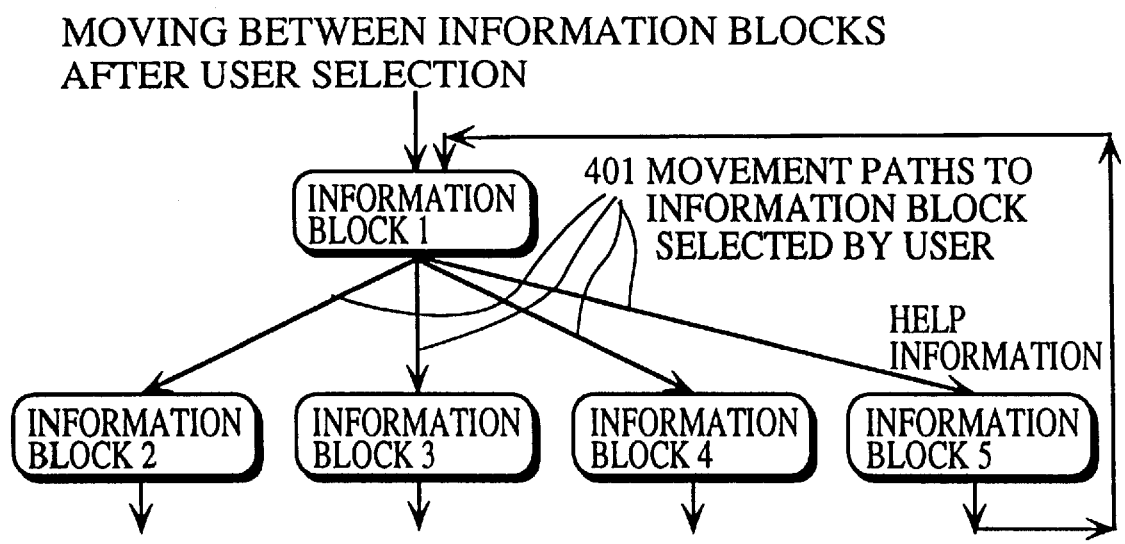
FIGS. 4(a) and 4(b) are figures showing the movement between information blocks.
Figure 4B:
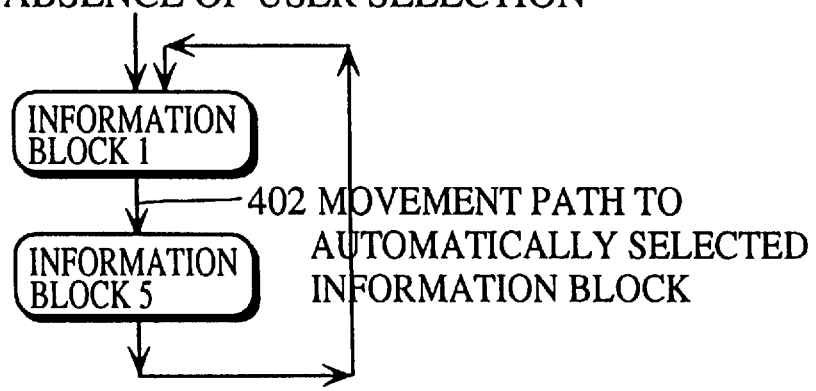

FIG. 1 is a block diagram showing the construction of the multimedia data reproduction device in the first embodiment of the present invention, FIG. 2 is a flowchart for the operation of the information block diagram reproduction means, FIG. 3 is a drawing showing an information block, and FIG. 4 is a figure showing movement between information blocks.

In FIG. 1, the information storage means 102 is composed of a storage medium, such as a CD-ROM. The information retrieval means 103 is composed of a read head for retrieving information from the storage medium. The information block reproduction means 101 is a function unit for reproducing the information retrieved by the information retrieval means 103. The information output means 104 is composed of an output unit for outputting the information to be reproduced visually via a screen and aurally via a speaker. The indication input means 105 is made up of a mouse, keypad, keyboard or suchlike, which is used for manually switching the image displayed on the screen. The indication analysis means 106 is a function unit which analyses the input indication from the indication input means 105 and passes it on to the information block reproduction means 101. The command decoding execution means 107 is the command analysis execution means which, when there has been an execution indication for the indication reception media reproduction unit 112 in the information block reproduction means 101 which controls the reproduction of indication reception media such as buttons and multiple selection lists, retrieves the command out of the selected indication reception media and has the command actually executed.

The information storage means 102 stores groups of information blocks 113 made up of the information block reproduction control information 114 and groups of media reproduction information 115. Here an information block is a scene made up of a combination of any of video, audio, text, and button media images. Each information block has a set reproduction time. In FIG. 3(c), the progression of the information block 1, which has a reproduction time of thirty seconds, with time is shown. FIGS. 3(a) and 3(b) show examples of images displayed on the screen at a given point within information block 1. The groups of information blocks refer to numbers of information blocks which are interconnected at different levels. An example of the composition of such levels is shown in FIG. 4. The information block reproduction control information 114 is the information which expresses the inter-level relations for each of the information blocks. The groups of media reproduction information 115 are the sets of data for each information block which show what will be reproduced on each medium at which position of the display for any point during the reproduction time.

The information block reproduction means 101 includes a media reproduction period management table 110, a command discharge condition period management information 111, group of media reproduction units 109, a group of indication reception reproduction units 112 and an information block reproduction control unit 108. The media reproduction period management table 110 is a table showing the reproduction starting time and ending time for each medium, as shown in the example in Table 1.

TABLE 1 media reproduction period management table for information block 1

| | reproduction start time | reproduction end time |
|---|---|---|
| video | 0 seconds | 30 seconds |
| button media A | 0 seconds | 30 seconds |
| button media B | 0 seconds | 30 seconds |
| button media C | 0 seconds | 30 seconds |
| text media | 0 seconds | 20 seconds |
| button media D | 20 seconds | 30 seconds |

This table is read from the information storage means 102 and is temporarily stored in the information block reproduction means 101 at the start of reproduction. The command discharge condition period management information 111 contains the conditions (discharge conditions) for transferring to a next information block, regarding the lack of a selection by the user of any of the button media displayed on the screen in the same way as a user operation. This condition is retrieved from the information storage means 102 in the same way as the media reproduction period management table 110. As can be seen in FIGS. 3(c) and FIGS. 3(a), 3(b), the discharge condition for information block 1 is activated, if there is no user operation selecting one of the button media within the 30 second reproduction period, with the selection condition display frame 307 showing that there will be an automatic transfer to a predetermined information block, in this case the information block displayed after the selection of button media C 306.

The group of media reproduction units 109 execute the reproduction of media, such as video, static images, audio, or text, which are not media (unlike button media or selection lists) which can be operated by means of indication by the user, with the hereafter referred to as indication reception media. Separate reproduction units are necessary for the reproduction of video, the reproduction of sound and the reproduction of text but, since there are known techniques for constructing each of these functions, in this embodiment the means for performing these functions have been grouped together and are referred to as the group of media reproduction units 109. The group of indication reception media reproduction units 112 are the units which reproduce the indication reception media and provide the command decoding execution means 107 with the necessary information. The group of indication reception media reproduction units 112 store a table of information for the indication reception media corresponded to the commands they represent, with this table being retrieved from the information storage means 102. An example is shown in Table 2.

TABLE 2

Example of commands stored by each button medium

| Button media | Stored command |
|---|---|
| Button media A | GOTO Information Block 2 |
| Button media B | GOTO Information Block 3 |
| Button media C | GOTO Information Block 4 |
| Button media D | GOTO Information Block 5 |

This table only shows the information relating to information block 1, but in reality the group of indication reception media reproduction units 112 store information for every information block. The group of indication reception media reproduction units 112 store the information to be provided to the command decoding execution means 107 when there is a selection by the user of one of the indication reception media or when a lack of a selection by the user is regarded in the same way as a user operation. Having received this information, the command decoding execution means 107 refers to Table 2 contained in the group of indication reception media reproduction units 112 and interprets the command shown in the information, before notifying the information block reproduction control unit 108 of the result.

The information block reproduction control unit 108 performs the control operation shown in FIG. 2, with the following explanation describing each step in the drawing.

In FIG. 2, in step 201 the information block reproduction control unit 108 receives and confirms the indications from the indication analysis means 106 and command decoding execution means 107. In step 202, it judges whether there was an indication to terminate the reproduction of the information block presently being reproduced and to show a next information block. If there was an indication to show a next information block, then in step 213 the information block reproduction control unit 108 indicates an interruption of the current information block, in step 214 it loads the next information block from the information storage means 102 and in step 215 it gives an indication for the actual reproduction process of the next information block. If the received indication is not an indication to view a next information block, in step 203 the information block reproduction control unit 108 judges whether there is a change in the display state of the buttons or an indication for execution of an instruction for the buttons. When there is a button related indication, in step 207 the information block reproduction control unit 108 judges whether there was a change process for the selected button or an execution process. If it judges that there was a change process, in step 208 the information block reproduction control unit 108 indicates to the group of indication reception media reproduction units 112 to change the selected button. Based on this change indication, the selection condition display frame 307 moves to the selected button media on the display screen. If there is an execution indication, then in step 209 the information block reproduction control unit 108 gives an execution indication to the group of indication reception media reproduction units 112 in the same way. As a result, the group of indication reception media reproduction units 112 retrieve the command held by the button and pass it on to the command decoding execution means 107. In all other cases, in step 204 the information block reproduction control unit 108 checks whether, after the reproduction period, the discharge condition specified in the command discharge condition period management information 111 is satisfied, if it is satisfied judging in step 210 whether the selection condition display frame 307 is the position of the button for which the discharge condition is satisfied, moving the selection condition display frame 307 to the said button if it is not already positioned there (step 211). Next, in step 212 the information block reproduction control unit 108 gives an indication to the group of indication reception media reproduction units 112 to discharge the button indicated by the selection condition display frame 307 and changes the indication for the command decoding execution means 107 to the reproduction process for the next information block, before returning to step 201. In any other case, the reproduction of all the media is continued at step 206 and the system returns to step 201.

FIG. 3(*a*) shows an example of the display shown by the information output means 104 in reproduction sector 1 inside information block 1, FIG. 3(*b*) shows an example of the display in reproduction sector 2 and FIG. 3(*c*) shows an example of the media reproduction status of reproduction sectors 1 and 2 in information block 1. In FIG. 3(*a*) and FIG. 3(*b*), 301 is an example display screen for the information output means 104, 302 is the video media display area and 303 is the text media display area. 304, 305, 306 and 308 are the reproduction areas for the different button media, with 307 being the selection condition display frame for showing which of the button media is currently being selected. In FIG. 3(*c*), 311–316 show the reproduction periods for each of the media. As can be seen from FIG. 3(*c*), the reproduction period for the video media and the button media A-C is thirty seconds, while since the reproduction period for the text media only covers reproduction sector 1, its duration is twenty seconds. Similarly since the reproduction period for the button media D only covers reproduction sector 2, it only covers the ten second period between the twenty second and thirty second marks.

In FIG. 4(*a*) the information blocks 2, 3, 4 and 5 are set as the branch destinations of the button media A, B, C and D in information block 1, so that this drawing shows the flow between information blocks when there is a user operation and when there is a setting for automatic discharge of button media D. FIG. 4(*b*) shows the flow between information blocks when there is no user operation and there is automatic selection.

The following is a description of the operation of the multimedia data reproduction device constructed as described above. First, the information block 1 is retrieved from the information storage means 102. Since the reproduction period of information block 1 is specified, if during reproduction sector 1 there is no selection by the user of the button media 304–306, (as can be seen once 20 seconds have expired in FIG. 3(*c*) or in Table 1), the system advances to reproduction sector 2. During reproduction sector 2, the block media D 308 for branching to an information block of help information is displayed in case the user does not understand how to operate the system. However, since a user who cannot operate the system may not know how to select a branch destination, there can be occasions when the user will not be able to use even a button media D labelled "Help" for branching to information block 5, so that ten seconds will expire, and in due course the automatic discharge condition will be satisfied. In such a case, in this embodiment, instead of merely branching to a predetermined information block, the information block reproduction control unit 108 will judge whether the selection condition display frame 307 is positioned on the automatic discharge button, if it is not, then moving the selection condition display frame 307 to that button and executing the branching stored by that button. Therefore, the user can visually confirm the result of the selection, and can therefore know which button was selected as well as what movement was caused as a result of that selection.

By using the device of the present invention described above, when moving between information blocks, instead of merely moving to a branch destination, then if at least the branch destination is stored in the indication reception media, by using an automatic discharge function of the button which specifies a branch to a given branch destination, a button is automatically selected and automatically executed, so that the user can easily check to which branch destination the system has moved.

Also, as is shown in Table 3, for the multimedia reproduction system of the present embodiment, commands other than branch commands can be stored in button media D, with automatic discharge of these commands also being possible. In such a case, instead of branching to the help information block, hidden help information can be displayed, thereby giving the same result as before.

TABLE 3

Alternative example of commands stored by each button medium

| Button media | Stored command |
|---|---|
| Button media A | GOTO Information Block 2 |
| Button media B | GOTO Information Block 3 |
| Button media C | GOTO Information Block 4 |
| Button media D | SHOW hidden help information 1 |

Second Embodiment

Figure 6:
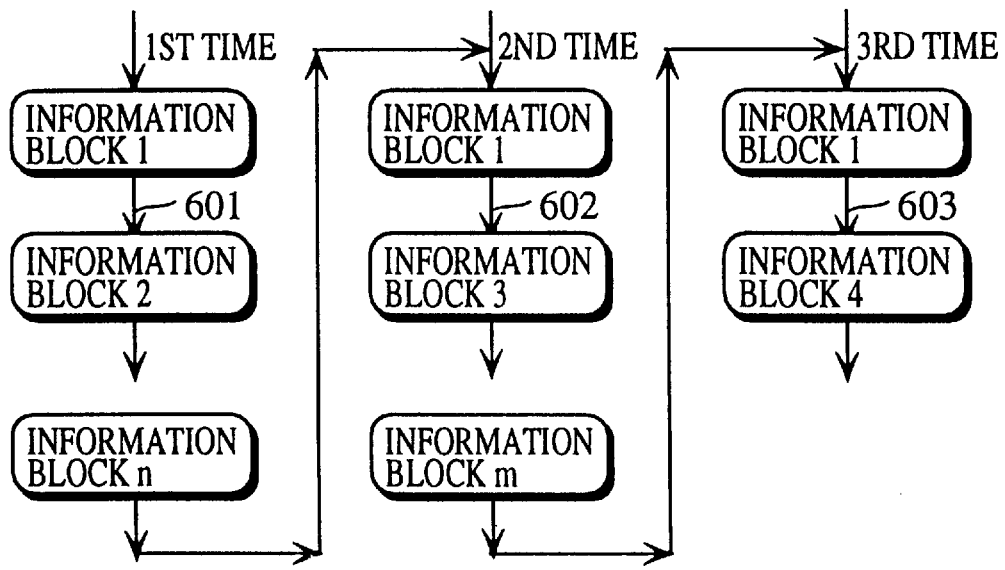
FIGS. 6(a) and 6(b) are figures showing the movement between information blocks in the second embodiment.
Figure 6:
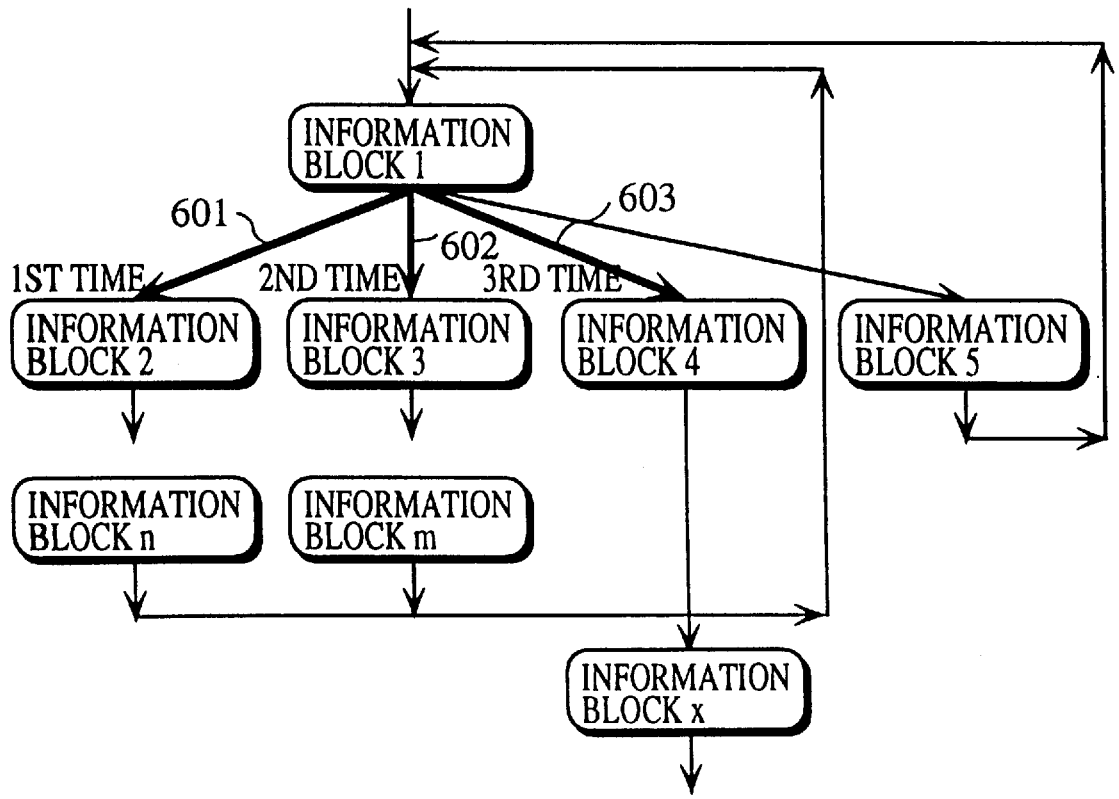

FIG. 5 is a block diagram showing the construction of the multimedia data presentation device in the second embodiment of the present invention, and FIG. 6 is a figure showing movement between information blocks.

In FIG. 5, the groups of information blocks 513 stored by the information storage means 502 have different inter-level relationships to the first embodiment, which can be seen in FIG. 6. The construction also differs in that the command discharge order management table 511 is included in place of the command discharge condition period management information 111 of FIG. 1. Otherwise the construction is the same as the first embodiment. Accordingly, only the new construction elements will be explained. In the command discharge order management table 511, the information block which should be reproduced following the present information block and the condition for moving to the reproduction of the following reproduction block are shown. Using this information, when starting the reproduction of an information block, the condition by which the discharge condition is verified in 204 of the algorithm in FIG. 2 is set during every execution.

In FIG. 6, both (a) and (b) show the movement patterns between information blocks, with 601, 602 and 603 showing the branches which automatically select the information block to be reproduced the first and $(3*N+1)^{th}$ time, the second and $(3*N+2)^{th}$ time, and the third and $(3*N)^{th}$ time, respectively. In these drawings, only information block 5 is restricted to being accessed by user operation only.

TABLE 4

Example of the command discharge order management table 511 a) Example of table of only discharge order

| Button media | Automatic discharge order |
|---|---|
| Button media A | 1 |
| Button media B | 2 |
| Button media C | 3 |
| Button media D | not discharged | b) Example of table with discharge time

| Button media | Automatic discharge order | Automatic discharge time |
|---|---|---|
| Button media A | 1 | 30 seconds |
| Button media B | 2 | 30 seconds |
| Button media C | 3 | 30 seconds |
| Button media D | not discharged | — |

Table 4 is an example of a command discharge order management table 511 in the present embodiment. In this example table, in the same way is shown by the information block inter-level relationships in FIG. 6, the button media A is automatically selected the first and $(3*+1)^{th}$ time, button media B is automatically selected the second and $(3*+2)^{th}$ time, button media A is automatically selected the third and $(3*)^{th}$ time, and button media D is never automatically selected. The only difference between (a) and (b) is that (b) also stores the discharge condition.

The following is a description of the operation of the multimedia data reproduction device constructed as described above, with reference to FIGS. 2, 3, 5 and 6, as well as to Table 2 and Table 4. This embodiment will also be explained using the information block 1 shown in FIG. 3, supposing that the group of button media store the commands shown in Table 2.

In the command discharge order management table 511, the information block which should be reproduced following the present information block and the condition for moving to the reproduction of the following reproduction block are shown, with each time the reproduction of information block 1 is started the information block to be discharged being selected as shown in the command discharge order management table 511, with the condition being set as the judging condition in the discharge condition verifying step 204 in FIG. 2. Once this discharge condition has been set, the process is the same as that shown by the algorithm in FIG. 2. Accordingly, when the discharge condition is satisfied in step 205, then instead of merely branching to a specified information block, it is determined in step 210 whether the selection condition display frame 307 is positioned on the automatic discharge button media, out of the button media which store a different branch destination every time, moving the selection condition display frame 307 to the automatic discharge button media in step 211 if it is not positioned there and, since the button media storing the branch destination is executed, the user can visually check the effect of the selection of that button media, as well as being able to set an automatic reproduction route with successive selection of the branch destinations.

1. Since automatic branching does not lead to the same branch destination every time, as shown in FIG. 6, the information blocks can be automatically reproduced successively.

2. Automatic-selection reproduction and manual user-selection reproduction are simultaneously possible.

3. During automatic-selection reproduction, instead of merely moving to a branch destination, by using the automatic discharge function for the button which specifies a branch to the branch destination, the user can easily verify which branch destination has been automatically selected.

In this embodiment, the explanation has focused on an algorithm whereby information block 2 is set as the first cycle and information block 3 is set as the second cycle, although the user may, after selecting information block 3 and coming next to information block 1, set the algorithm so as to reproduce information block 4 after information block 3, even if it is the second cycle. In this case it is not necessary to store how many times the information block has been reproduced, and the user can determine from which group of information blocks the system has returned.

Furthermore, for the multimedia data reproduction device of the present embodiment, the button can store commands other than branch commands, in the same way as in the first embodiment, with the automatic discharge of these commands also being possible.

Third Embodiment

Figure 7:
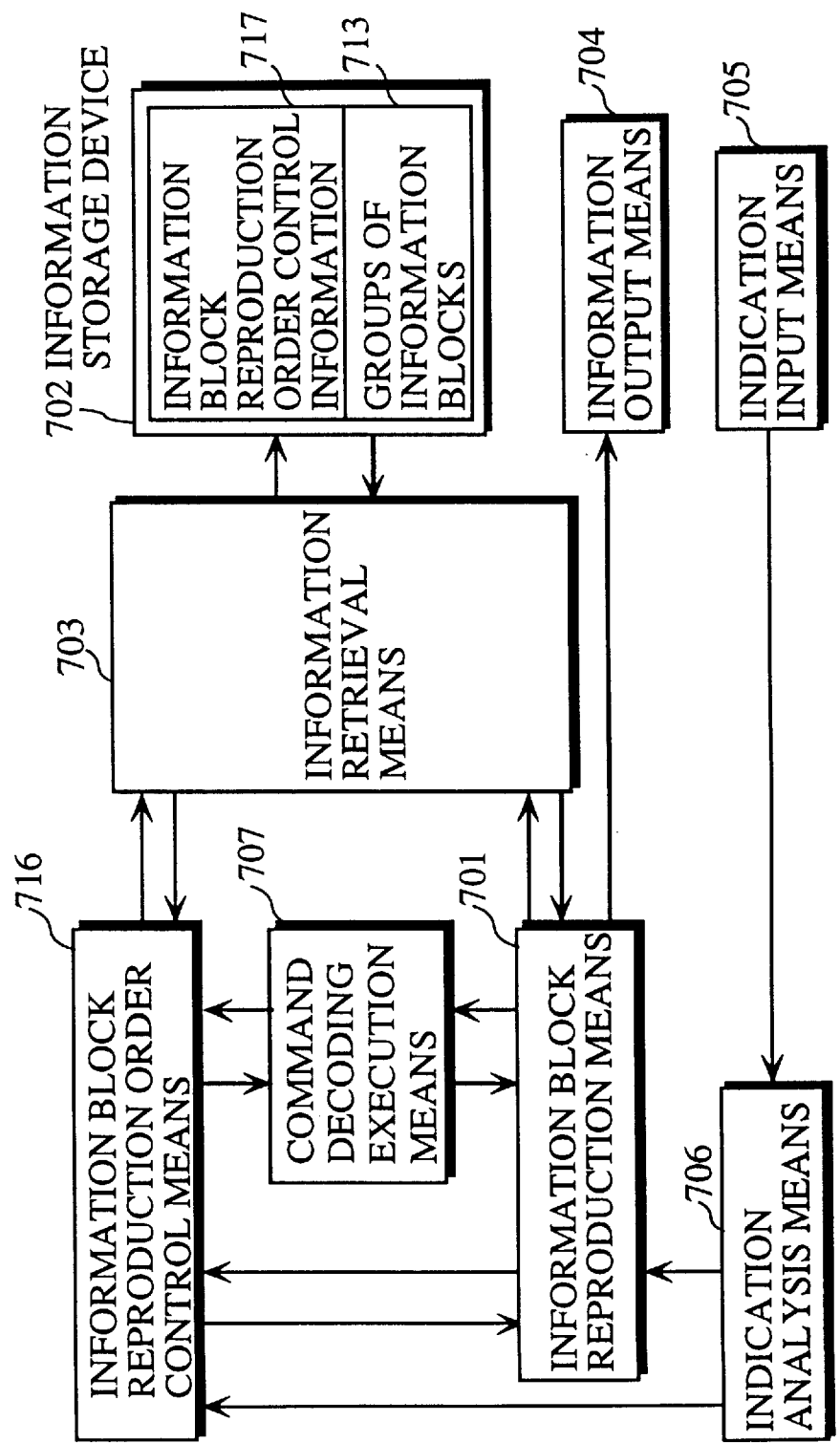
FIG. 7 is a block diagram showing the construction of the multimedia data presentation device in the third embodiment of the present invention.
Figure 8:
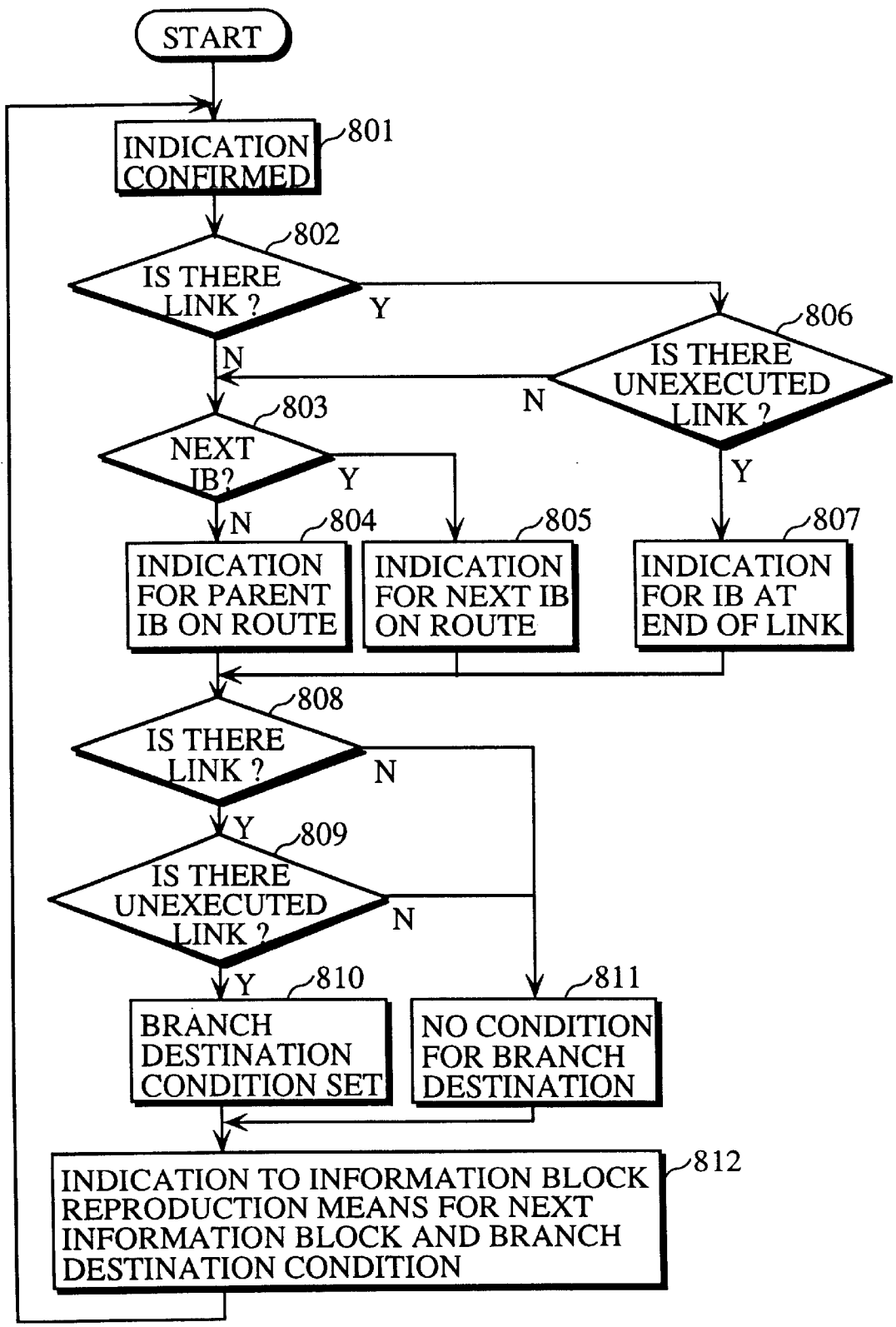
FIG. 8 is a flowchart showing the operation of the information block reproduction order control means in the third embodiment.
Figure 9:
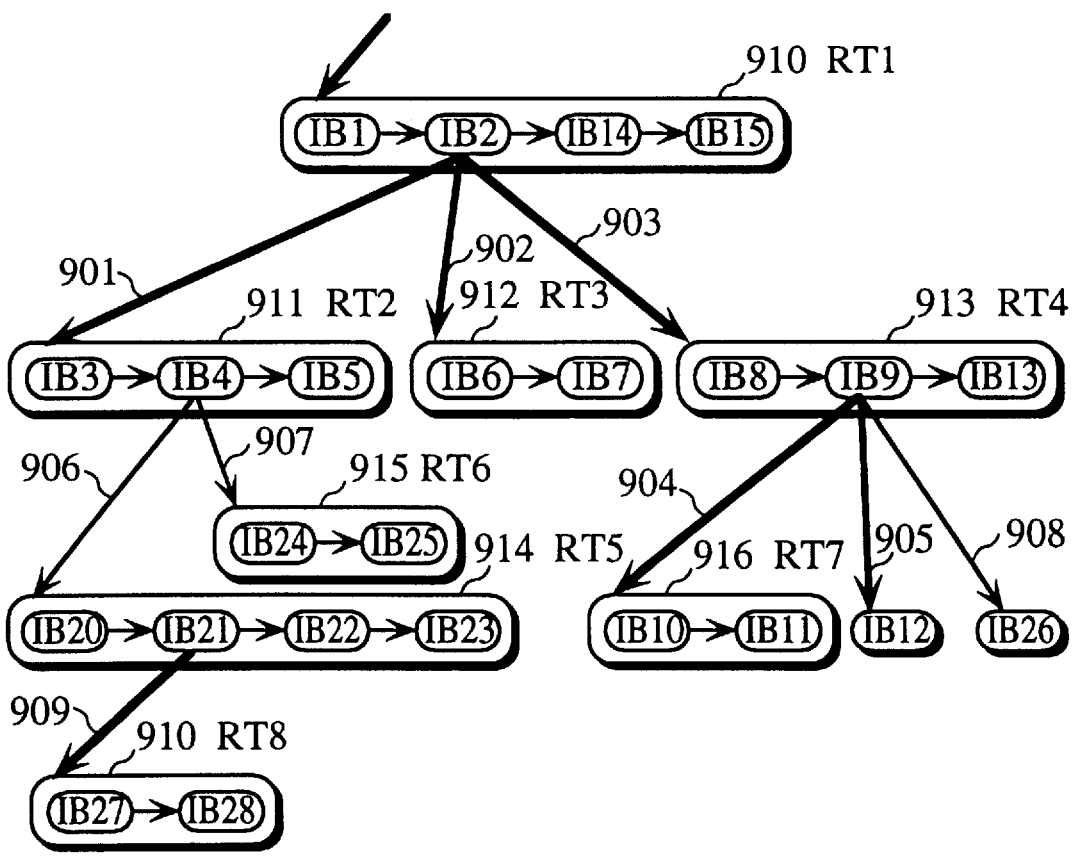
FIG. 9 is a figure showing the movement between information blocks in the third embodiment.
Figure 10:
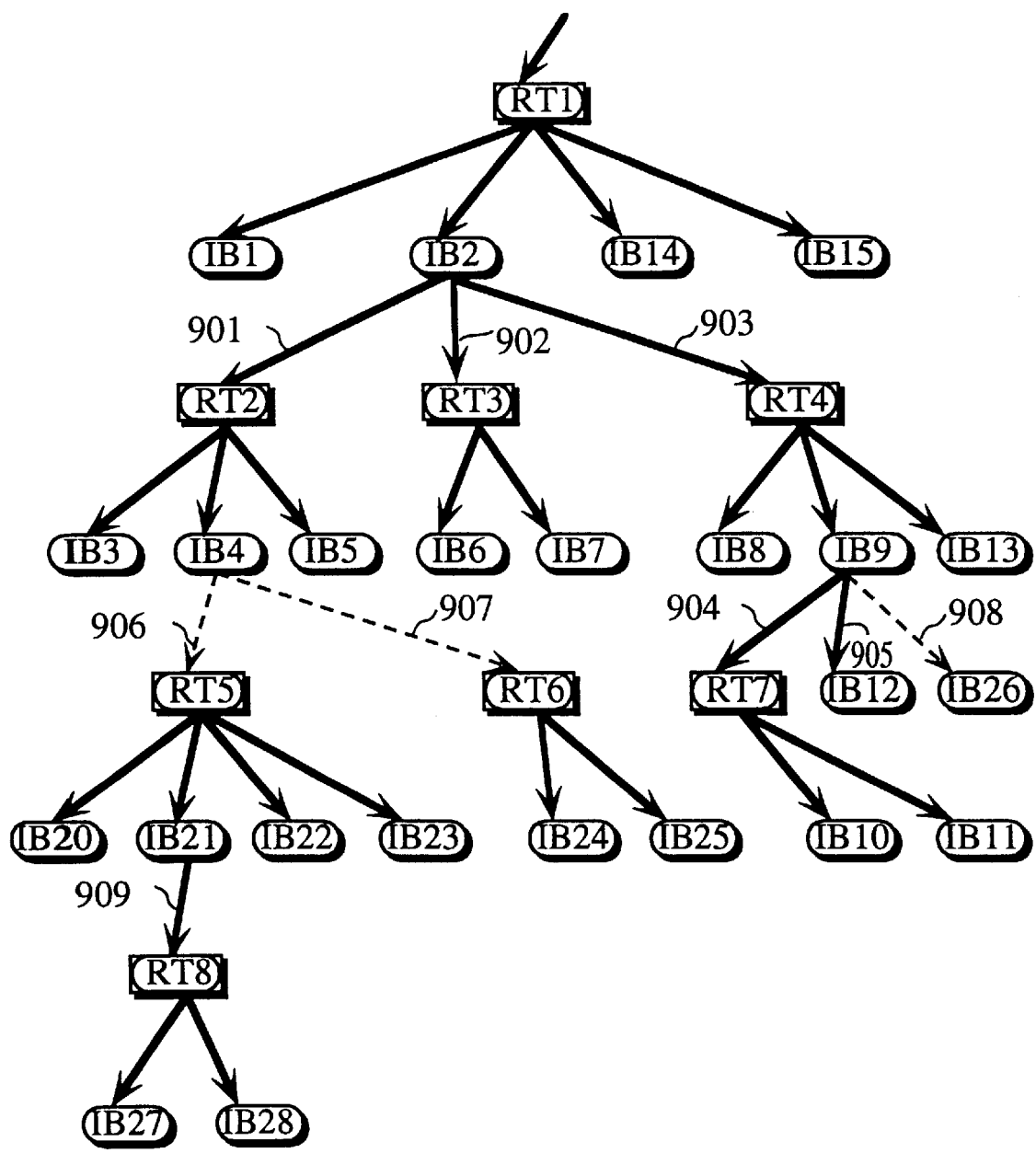
FIG. 10 is figure showing an alternative representation of the same arrangement of movement between information blocks in the third embodiment.

FIG. 7 is a block diagram showing the construction of the multimedia data presentation device in the third embodiment of the present invention, FIG. 8 is a flowchart showing the algorithm by which the information block reproduction order control means decides which information block to reproduce next, as well as how it sets the discharge condition for doing so, FIG. 9 is a drawing showing movement between the information blocks, and FIG. 10 is a drawing showing an alternative arrangement for movement between information blocks. Table 5 is the information block reproduction order management table.

TABLE 5

Information block reproduction order management table a) Route and information block separation management method
a1) Route level management table

| | Parent RT | Parent IB | IB list |
|---|---|---|---|
| RT1 | — | — | IB1, IB2, IB14, IB15 |
| RT2 | RT1 | IB2 | IB3, IB4, IB5 |
| RT3 | RT1 | IB2 | IB6, IB7 |
| RT4 | RT1 | IB2 | IB8, IB9, IB13 |
| RT5 | RT2 | IB4 | IB20, IB21, IB22, IB23 |
| RT6 | RT2 | IB4 | IB24, IB25 |
| RT7 | RT4 | IB9 | IB10, IB11 |
| RT8 | RT5 | IB21 | IB27, IB28 | a2) Link address in information block and automatic reproduction comparison management table

| | Link Address | Automatic Reproduction Node |
|---|---|---|
| IB2 | RT2, RT3, RT4 | RT2, RT3, RT4 |
| IB4 | RT5, RT6 | NONE |
| IB9 | RT7, IB12, IB26 | RT7, IB12 |
| IB21 | RT8 | RT8 |

TABLE 5-continued

Information block reproduction order management table b) Coexistent (cruise node) management method
Cruise node management table

| | Parent node | Automatic reproduction node list | Link Address |
|---|---|---|---|
| RT1 | | IB1, IB2, IB14, IB15 | NONE |
| IB2 | RT1 | RT2, RT3, RT4 | NONE |
| RT2 | RT1 | IB3, IB4, IB5 | NONE |
| RT3 | RT1 | IB6, IB7 | NONE |
| RT4 | RT1 | IB8, IB8, IB13 | NONE |
| IB4 | RT2 | NONE | RT5, RT6 |
| RT5 | IB4 | IB20, IB21, IB22, IB23 | NONE |
| RT6 | IB4 | IB24, IB25 | NONE |
| IB9 | RT4 | RT7, IB12 | IB26 |
| RT7 | IB9 | IB10, IB11 | NONE |
| IB21 | RT4 | RT8 | NONE |
| RT8 | IB21 | IB27, IB28 | NONE |

The construction elements in the multimedia data reproduction device shown in FIG. 7 are fundamentally the same as those in FIGS. 1 and 5, but have been described briefly below.

701 is the information block reproduction means, equipped with the algorithm shown in FIG. 2, which executes the automatic selection execution process for the indication reception media, such as buttons, and the reproduction control of the media information in each information block. 702 is the information storage means which stores the information blocks 713 and the information block reproduction order control information 717 for controlling the reproduction order of the groups of information blocks. The information blocks 713 are made up of information block reproduction control information (514) and media reproduction information (515) as was shown in FIG. 1. The information block reproduction order control information 717 contains the reproduction order of every information block and routes made up of groupings of a number of information blocks. In FIG. 9, the elliptical marks IB1, IB2. . . IB28 are information blocks, with the arrows between one information block and another showing the reproduction order. Also the frames 910–917 which surround a number of information blocks IB1, IB2. . . are the routes RT1. . . RT8. In each of the routes, the arrows from one information block to another show that the reproduction will proceed in this order without waiting for an indication from the user, with the arrows 901–909 showing transfers between routes due to an operation by the user or by automatic discharge. Among these, the thick arrows 901–905, 909 show the links which are made by means of automatic discharge, while 906–908 show the links which are not made by means of automatic discharge, but can only be made by means of a user operation. Here a route is one set of a number of information blocks grouped together so as to display a sequence, for example, a movement sequence on the screen.

703 is the information retrieval means. 704 is the information output means, composed of a display or speaker. 705 is the indication input means, made up of a mouse, keypad, keyboard or suchlike. 706 is the indication analysis means which analyses the input indication from the indication input means 705 and passes it on to the information block reproduction means 701. The command decoding execution means 707 is the command analysis execution means which, when there has been an execution indication for the indication reception media, such as buttons or a multiple selection list, in the information block reproduction means 701, has the command stored by the selected indication reception media executed. 716 is the information block reproduction order control means for retrieving the information block reproduction order control information stored in the information storage means 702 and for controlling the reproduction order of the information blocks by controlling the information block reproduction means 701 based on this information.

FIG. 8 is the flowchart showing the information block reproduction order control. The processes executed in FIG. 8 can be classified into two sequences. The first sequence is the determination between steps 802 and 807 of the next information block to be reproduced, while the second sequence between steps 808 and 811 determines the discharge condition which indicates in what circumstances the selected information block will be reproduced. In Step 801, the indications from the indication analysis means 706 and command decoding execution means 707 and the notification of the completion of reproduction from the information block reproduction means 701 are received and confirmed by the information block reproduction order control means 716. In step 802 it determines whether there are any indication reception media to be automatically discharged in the information block currently being reproduced. If there are no indication reception media to be automatically discharged in the current information block, then the information block reproduction order control means 716 determines in step 803 whether there are any information blocks remaining in the same route as the information block currently being reproduced. If there are any such information blocks remaining, then in step 806 the next information block in the route is set as the next information block to be reproduced and the process advances to step 808. If there are no such information blocks, then in step 804 the next information block in the parent of the current route (the route from which the branch to the present route came) is set as the next information block to be reproduced and the process advances to step 808. When the information block reproduction order control means 716 determines in step 802 that there are indication reception media to be automatically discharged in the information block currently being reproduced, then it judges in step 806 whether there are any indication reception media yet to be automatically discharged, advancing to step 803 if there are no such indication reception media. If there are any indication reception media yet to be automatically discharged, then in step 807 the information block linked by the next link to be automatically discharged is set as the next information block to be reproduced and the process advances to step 808. In step 808, the information block reproduction order control means 716 determines whether there are any links to be automatically discharged in the next information block to be reproduced. If there are no such information blocks, the next information block to be reproduced is passed on to the information block reproduction means in step 811 with the branch address condition being set as "NONE", before the process advances to step 812. When it determines in step 808 that there is a link to be automatically discharged, the process advances to step 809 where the information block reproduction order control means 716 determines whether there are any unexecuted links, with when there is such a link, this link being set as the branch destination condition, before the process advances to step 812. When there are no such links in step 809, the process advance to step 811. In step 812, the set branch destination condition and the next information block to be reproduced are passed on to the information block reproduction means 701 and the information block reproduction order control means 716 controls the information block reproduction means 701.

In step 807, the next indication reception media to be automatically discharged is selected out of all the indication reception media to be automatically discharged with the selection criterion being set beforehand, for example, as the link address information blocks being selected in order of the route identification number of the route to which they belong, starting with the lowest route identification number.

FIG. 10 is a drawing showing an alternative representation of the same arrangement as FIG. 9 of the information blocks and routes. In this drawing, the elliptical nodes IB1. . . IB28 represent the information blocks. RT1 through RT8 are the nodes which represent the routes for managing the reproduction order of series of information blocks. 901 through 905 are the automatically discharged links which constitute the main route, while 909 is an automatically discharged link which is not on the main route, and 906 through 908 are links which are not automatically discharged. The other arrows are automatic reproduction links which are developed from the routes.

Table 5 shows the information block reproduction order control management table constructed according to the example data composition in FIGS. 9 and 10. This management table is generated by the information block reproduction order control means 716 based on the information block reproduction order control information it retrieves from the information storage means 702 at the start of reproduction. The (a) part of Table 5 has a route level management table which shows the routes and their inter-level relations and a link management table which manages the link information such as the automatic discharge links. Table (b) is a rewritten form of Table (a) for managing the nodes.

In this embodiment, some information blocks, such as IB2 shown in FIG. 9, which have a link for transferring to another route have button media, such as information block IB1 in FIG. 3, which display on the screen a button for activating the link. On the other hand, other information blocks, such as IB1 shown in FIG. 9, which have no link for transferring to another route have no button media for storing branch commands.

Furthermore, since in the present embodiment the discharge order for automatic discharge links can be set for information blocks which have a number of automatic discharge links, the reproduction order for such links can be set.

By using these two functions, it is possible in the present embodiment to set the main reproduction route which is a default reproduction route. For the example given, the main route is composed of (RT1), IB1, IB2, (RT2), IB3, IB4, IB5, IB6 (RT3), IB6, IB7, IB2, (RT4), IB8, IB9, (RT7), IB10, IB11, IB9, IB12, IB9, IB13, IB2, IB14, IB15. Here, the names of the routes in parenthesis have been used to show the branching and not that these routes are reproduced in the actual process.

The following is an explanation of the function for automatically reproducing this main route with reference to the algorithm in FIG. 8.

When the reproduction of block IB1 is terminated for any reason, since this information block has no links and there is a next information block on the route, step 805 is selected, and information block IB2 is set as the next information block to be reproduced. Following this, since information block IB2 has a number of automatic discharge links and none of these links have been discharged, in step 810 the first automatic discharge link 901 is selected. As a result the reproduction advances to information block IB3.

After this, the reproduction advances to information block IB4 and, should the reproduction period expire during reproduction of this block, even though this information block has a number of links, these links are not automatic discharge links, so that the reproduction moves on to information block IB5. On the other hand, if the user should clearly give a selection indication for link 906 during the reproduction period of information block IB4, then the reproduction will obviously advance to information block IB20. Following this, once the reproduction of information block IB21 is completed, the automatic discharge link 909 will be selected and information block IB27 will be reproduced. The reproduction order following this will be IB28, IB21, IB22, IB23, IB4, IB5. Even if an information block not on the main route is selected during this automatic reproduction, automatic reproduction will still continue after the selected information block so that there will be an eventual return to the main route. Once the reproduction period for information block IB5 expires, since this information block has no automatic discharge links, and there is no following information block on the route, step 804 is selected and the reproduction returns to information block IB2. Since information block IB2 has a number of automatic discharge links, and in this case link 901 has already been discharged, in step 810 the next automatic discharge link 902 is selected. As a result on the completion of the reproduction of information block IB2, the reproduction advances according to automatic link 902 to information block IB6.

It should be noted here that the discharge conditions for the automatic discharge links are set for the information block reproduction order control means 716, although such conditions need not be set clearly, in which case the discharge condition in the information block reproduction means 701 can be set so as to discharge the link at the end of the reproduction period, or at the end of the reproduction period of the button which stores the automatic discharge link.

For the present embodiment described above, when moving between information blocks, there are the following two functions which were not available for the prior art:

1. the main route for default can be specified, so that the user can have the system successively and automatically reproduce information blocks positioned on the main route;
2. a combination of automatic selection and manual user-selected reproduction can be used, which is to say, automatic reproduction can be terminated and the information blocks to be reproduced selected manually, with in this case the system automatically returning to the main route and recommencing automatic reproduction when there is no manual selection within the reproduction period of an information block.

Fourth Embodiment

The multimedia data reproduction device in the fourth embodiment of the present invention, in addition to the functions of the device of the third embodiment, also has a "Return to previous information block" function which allows the user to terminate the reproduction of the present information block and have the previous information block reproduced, an "Advance to following information block" function which allows the user to terminate the reproduction of the present information block and have the following information block reproduced, and a "Move to parent information block" function for moving to an information block in the next upper level, with the user being able to activate these functions by means of manipulating the indication input means 705.

Figure 11A:
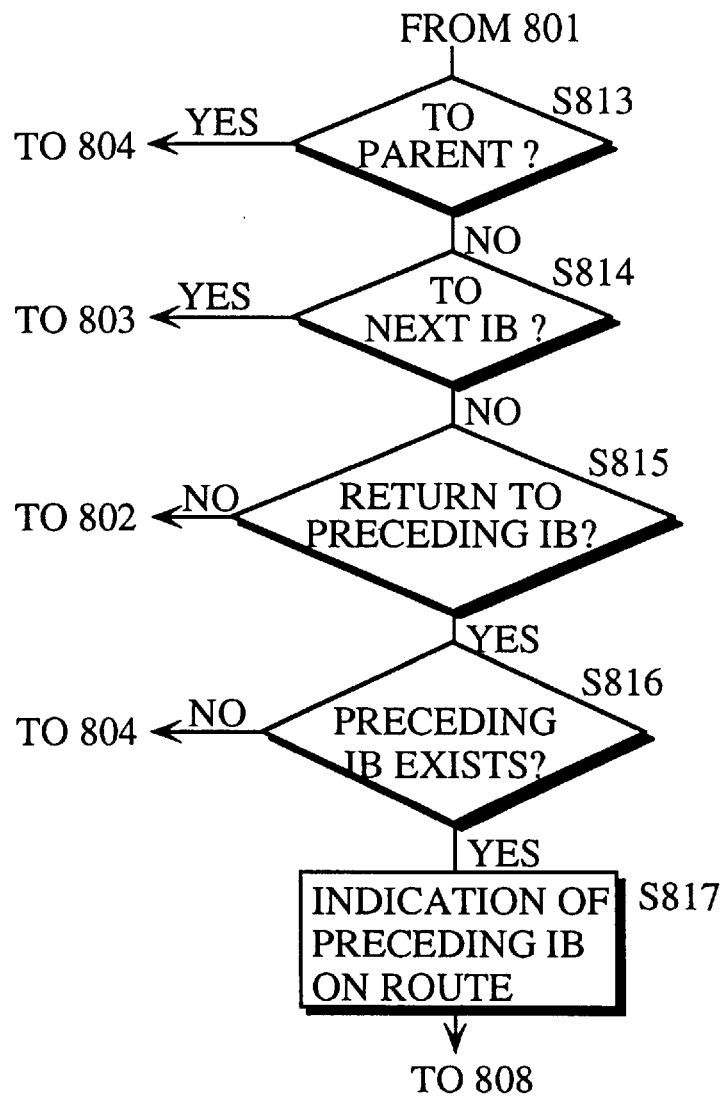
FIG. 11(a) is a figure showing the main processes in the operation of the fourth embodiment of the present invention.

FIG. 11(a) shows the process which should be added to the operation of the information block reproduction order control means for making the above functions possible. This process is inserted after step 801, with the same processing flow in FIG. 8 continuing from an address which is determined according to the processes in steps 813–817, with the respective addresses being shown in FIG. 11(a) for the steps 813–817. The following is a simplified description of the operation in each step. In step 813 it is determined whether there is a "Move to parent information block", with the process advancing to step 804 if "YES". If the result is "NO", then in step 814 it is determined whether there is a "Advance to following information block", with the process advancing to step 803 if "YES". If the result is "NO", then in step 815 it is determined whether there is a "Return to previous information block", with the process advancing to step 802 if "NO". If the result is "YES", then it is judged in step 816 whether there is a preceding information block in the same route, with the process advancing to step 817 only if there is a preceding information block. On the other hand, if there is no preceding block in the same route, the process advances to step 804.

By adding the above process, then during the reproduction of the main route, the user can give an "Advance to following information block" indication when she or he has no interest in the information block being reproduced and thereby can skip such information blocks. Also, the user can give a "Move to parent information block" indication when the user has no interest in the information in the route being reproduced, so as to exit from the said group of information. For the example in FIG. 9, if information block IB2 is an access block for group of interview articles, then route RT2 can be an interview with Mr A, route RT3 can be an interview with Ms B, and route RT4 can be an interview with Mr D, with each information block in the above routes representing one question and answer. Furthermore, there can also be a branch from information block IB4 to information related to the interviews. For this kind of arrangement, automatic reproduction following the main route will cover all of the questions and answers for the three interviews and will not reproduce the related information.

However, if the user has no interest in the interview with Mr A, then by giving a "Move to parent information block" indication when information block IB3 is being reproduced, the user can exit from this interview, so that the system returns to information block IB2 and then on to the interview with Ms B.

Again, if the user has no interest in the particular question and answer during the reproduction of IB3, then by giving a "Advance to following information block" indication, the user can move on to the next question and answer in information block IB4. Conversely, should the user have missed the reproduction of information block IB3, then by giving a "Return to previous information block" indication, the user can have the system return to information block IB3 and so hear/read the information one more time.

Also, if the user should have a great interest in the question and answer in information block IB4 and desire more detailed information, then by selecting the link button, the user can obtain more detailed information.

Figure 11B:
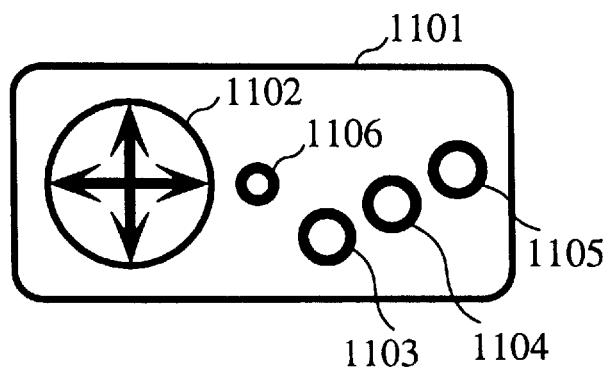
FIG. 11(b) is a figure showing an example of an indication input means.

It should be noted here that a construction such as that shown in FIG. 11(b) may be used as the indication input means 705. In this FIG. 1101 is indication input means made up of a keypad or suchlike, 1102 is a cursor key, and 1103–1106 are ordinary keys. In this case, an example setup would be 1103 as the "Execute button currently selected indication", 1104 as the "Advance to following information block indication", 1105 as the "Return to previous information block indication" and 1106 as the "Move to parent information block indication".

For the present embodiment described above, in addition to the functions:

1. successive automatic reproduction following the main reproduction route;
2. Easy transfer between manual and automatic reproduction;

of the third embodiment, there is the following third function:

3. Easy comprehension and manipulation of the relationships between different levels.

That is to say, in addition to displaying the relationships between information blocks on different levels, since reproduction of the main route will be assumed naturally, it becomes easy for the user to understand the present reproduction position and to select branch destinations for other information blocks.

Fifth Embodiment

Figure 12:
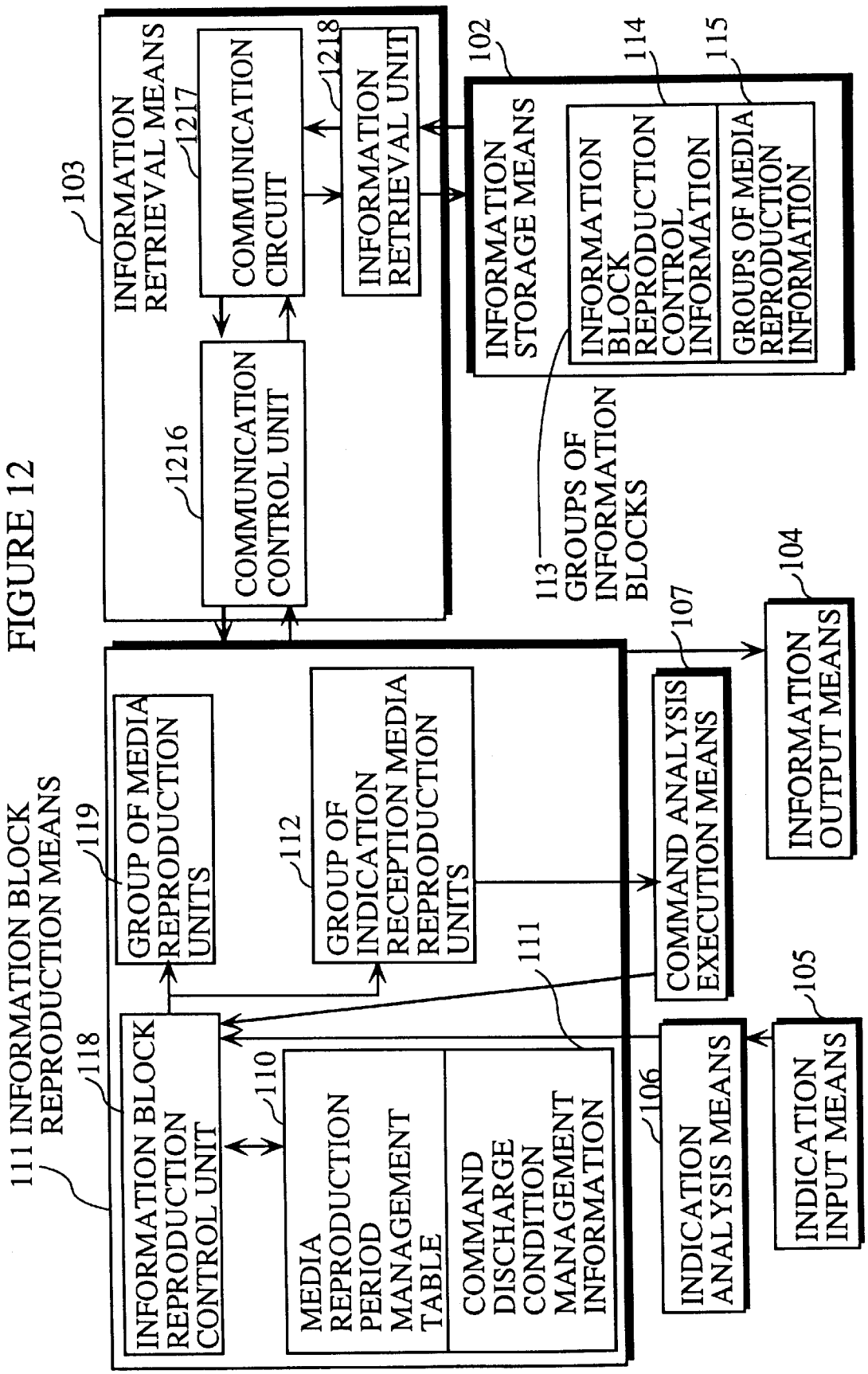
FIG. 12 is a block diagram showing the construction of the multimedia data presentation device in the fifth embodiment of the present invention.

FIG. 12 is a block diagram showing the construction of the multimedia data presentation device in the fifth embodiment of the present invention. In this drawing the construction elements 101–115 are all identical to those which were shown in FIG. 1. The difference is that the information retrieval means 103 contains a communication control unit 1216, a communication route 1217 and an information retrieval unit 1218.

The communication control unit 1216 is realized using a device common in the communications field for controlling transmission and reception of signals according to a communications protocol to and from a network to which the communication route 1217 is connected. Furthermore, the information retrieval unit 1218 is different from that used in the first embodiment in that, aside from the retrieval unit which retrieves information from the information storage means 102, it also includes a signal conversion circuit, such as a modem, for converting the retrieved information into a signal which can be transmitted on the network.

By means of the embodiment constructed as described above, since the information retrieval means includes a communication control unit 1216, the same information presentation methods as the first embodiment can be used for information blocks which are stored by host computers and video servers on a network. By doing so, the device need not be regarded as an information presentation device which merely uses a large capacity storage medium, such as CD-ROMs or other such optical discs, with the present embodiment allowing for the direct manipulation of information blocks supplied using a network.

Sixth Embodiment

Figure 13:
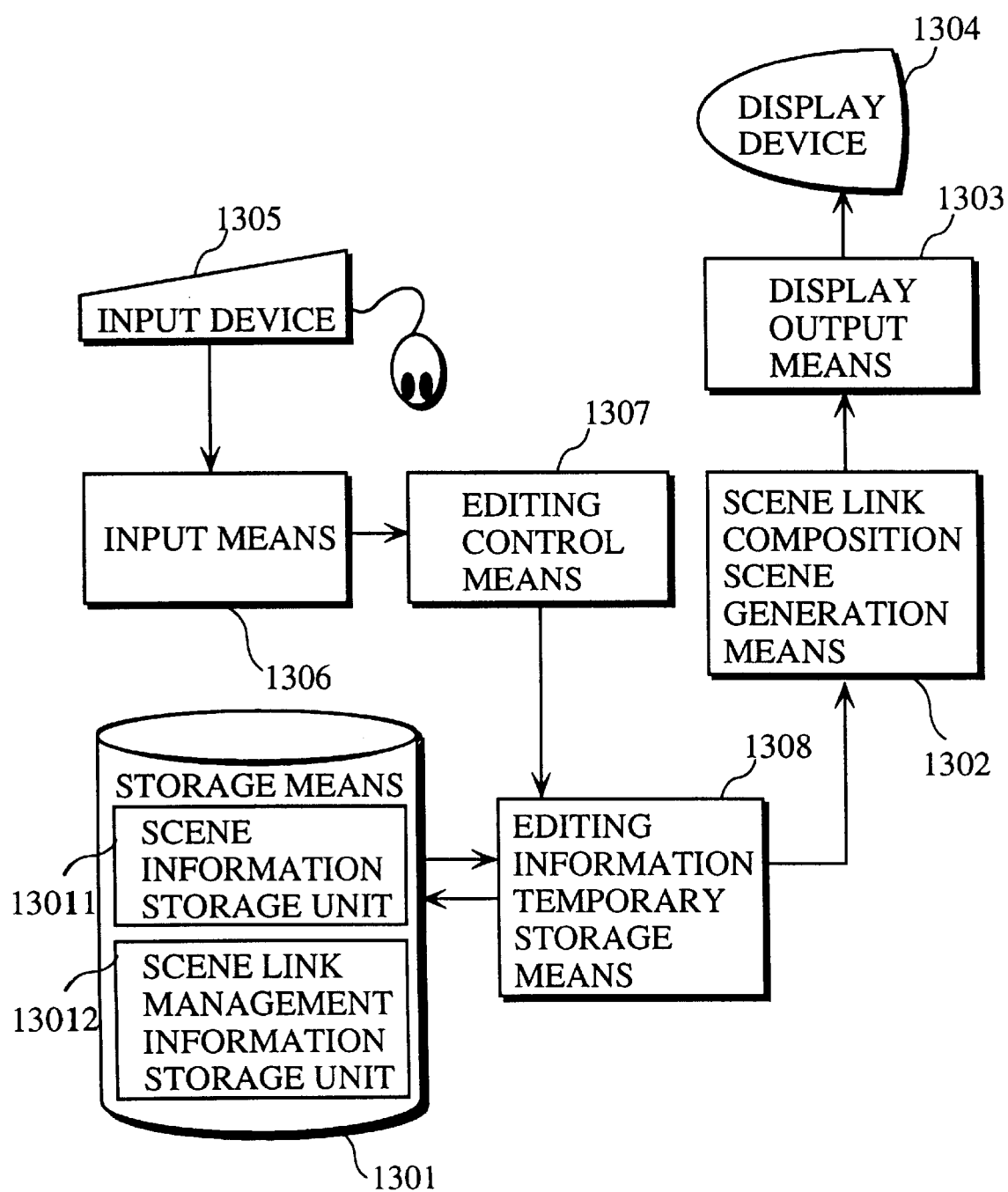
FIG. 13 is a block diagram showing the construction of the multimedia data editing device in the sixth embodiment of the present invention.

FIG. 13 is a block diagram showing the construction of the multimedia data editing device in the sixth embodiment of the present invention. In FIG. 13, the storage means 1301 includes a scene information storage unit 13011 and a scene link management information storage unit 13012. 1302 is the scene link composition screen generation means, 1303 is the display output means, 1304 is the display device, 1305 is the input device, 1306 is the input means, 1307 is the editing control means and 1308 is the editing information temporary storage means.

Figure 15:
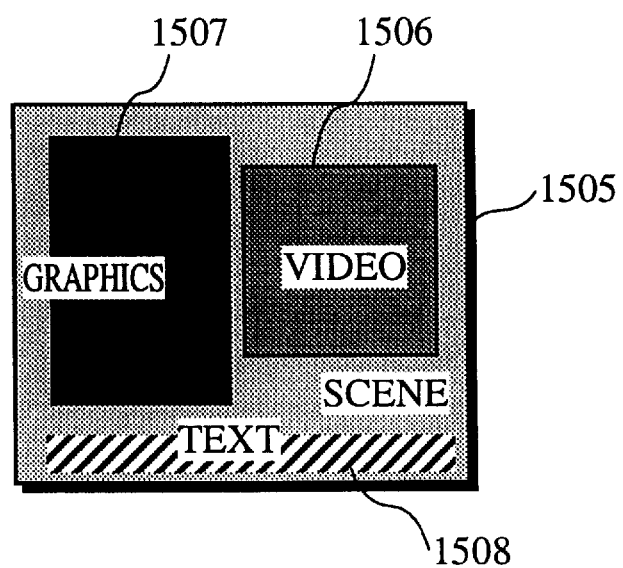
FIG. 15 is a example display of a scene to be edited by the multimedia data editing device in the sixth embodiment.
Figures 16, 17:
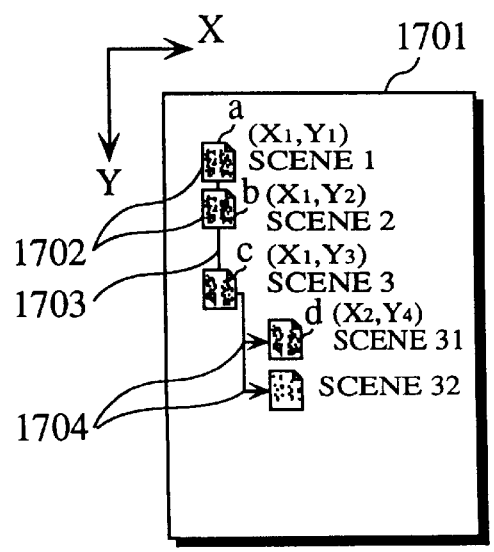
FIG. 16 is a table showing the link relationship information between scenes.
FIG. 17 is a drawing showing a scene link diagram.

The storage means 1301 is storage medium, such as a hard disk, for which both read and write are possible. The scene information storage unit 13011 included in the storage means 1301 stores the source data such as video, audio, graphics and text and the scene composition information for composing the source data into scenes. A scene is of the composition shown by the example 1505 in FIG. 15, with various pieces of source data 1506, 1507, 1508 being arranged in positions decided by the user. The scene composition data is the information which specifies at what position, at what time and for how long each of the pieces of source data 1506, 1507, 1508, made up of video, audio, graphics or text, will be displayed on the screen. When there are a number of scenes, the scene link management information storage unit 13012 included in the storage means 1301 stores the scene link management information 1601 which, as shown in FIG. 16, is made up of the scene link relation information and the link type information. The scene link management information 1601 shows that if scene 1 and scene 2 have a sibling relationship, then after scene 1 has been displayed and then disappears, scene 2 will always be displayed, and that if scene 3 and scene 32 have parent and child relationship, then the link is a pop-up method, with scene 32 being displayed so as to pop-up on top of scene 3.

The editing information temporary storage means 1308 is made up of semiconductor memory such as RAM and retrieves the scene link management information from the scene information storage unit 13011 in the storage means 1301, which it temporarily stores during editing as the scene link management information.

Figure 14:
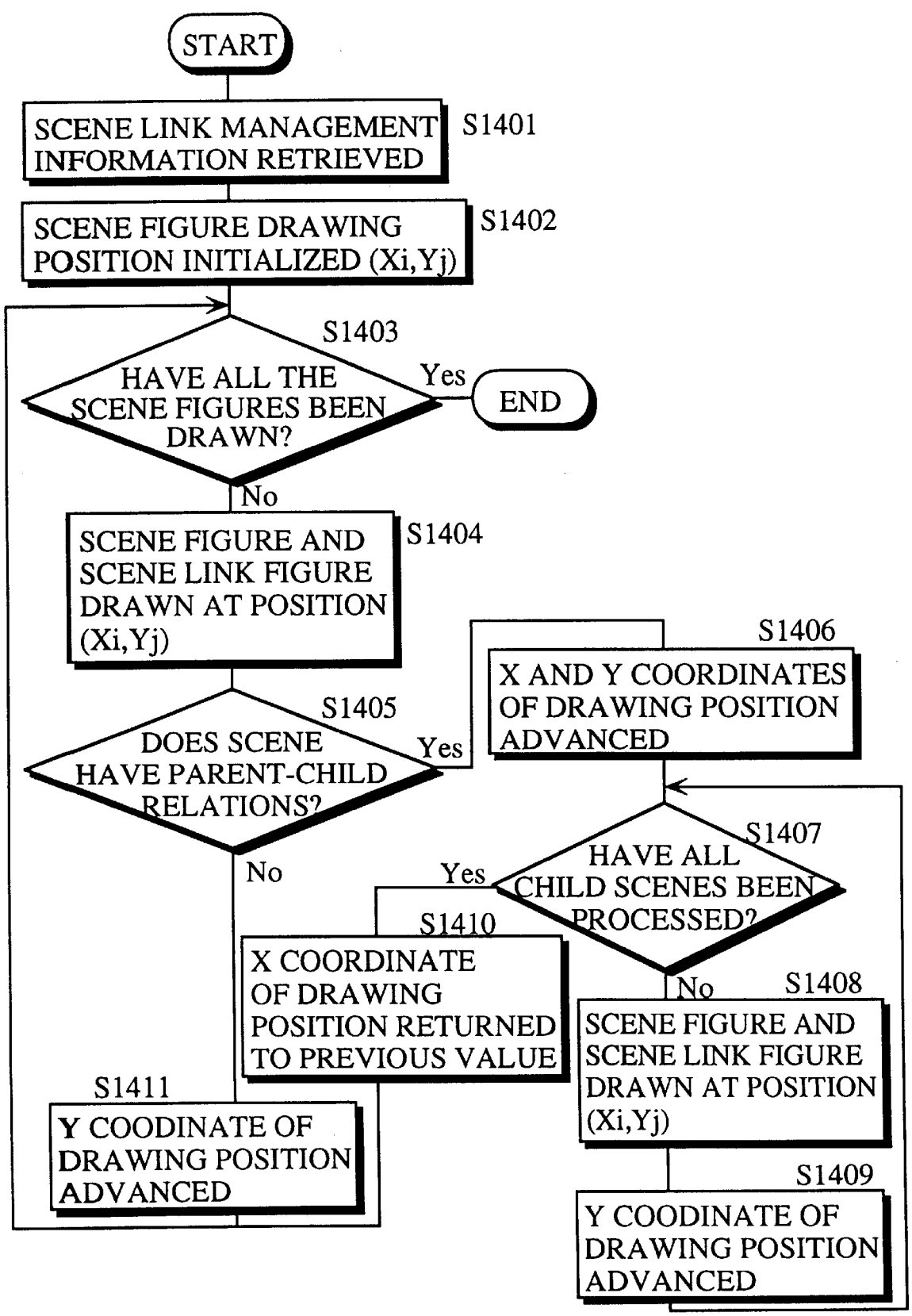
FIG. 14 is a flowchart showing the operation of the scene link composition screen generation means in the sixth embodiment.

The scene link composition screen generation means 1302 is constructed from one part of the CPU or from a specialized image processing processor. It retrieves the scene link management information from the editing information temporary storage means 1308 and, in addition to generating the scene diagram which is a simplified visual representation of the scenes and the scene link figure which visually represents the links between scenes, determines, based on the scene link management information, the forms of the scene figure and the scene link figure and the display positions of the scene figures and the scene link figures, before generating the scene link composition screen having a least one scene figure being linked by the scene link figure. A scene figure is, for example, an icon such as scene FIG. 1702 in FIG. 17 while a scene link figure is, for example, a combination of lines and arrows such as scene link FIG. 1703 and scene link FIG. 1704 in FIG. 17. When the scene management information is information such as the scene link management information 1601, then a scene link composition screen such as that shown in by scene link composition screen 1701 will be generated. This generation process is shown in FIG. 14. The display output means 1303 is constructed from an image memory coupled with one function within the CPU or with a specialized image processing processor, so that it can output the scene link composition screen generated by the scene link composition screen generation means 1302 to the display device 1304 which is a CRT or the like.

The input means 1306 is composed of one function in the CPU and receives an editing request input from the input device 1305 which is a keyboard, mouse or suchlike.

The editing control means 1307, composed of one function in the CPU, changes the scene link management information stored in the editing information temporary storage means 1308, based on the editing request input from the input means 1306, if said editing request input is a request to change the link management information of the scenes. If the editing request input is a request to update the scene link management information storage unit 13012, the editing control means 1307 updates the scene link management information stored in the scene link management information storage unit 13012 of the storage unit 1301 so as to conform with the information in the editing information temporary storage means 1308.

The following is an explanation of the scene link composition screen generation process with reference to FIG. 14. Here, the X and Y coordinates used in tracing the figures refer to the X and Y axes set as shown in FIG. 17. First, the scene link management information 1601 shown in FIG. 16 is retrieved from the editing information temporary storage means 1308 (S1401), and the initial values for the scene figure drawing position (Xi, Yj) are set, for example, the values for the top-left corner of the screen (S1402). Next, the scene link composition screen generation means 1302 draws the simplified representation a of scene 1 in the scene link management information 1601 at the position given by ($X_1$, $Y_1$) in FIG. 17 (S1404). Then the link relations and linked scene names for scene 1 are referenced, and it is determined that since scene 2 has a sibling relationship with scene 1, there is no parent-child relationship (S1405), so that the process advances to S1411, and the scene link composition screen generation means 1302 adds "1" to the Y coordinate. Accordingly, the simplified representation b of scene 2 is drawn at the position given by ($X_1$, $Y_2$) in FIG. 17 (S1404). Next, the scene link composition screen generation means 1302 references the link relations and linked scene names for scene 2 and, since scene 3 has a sibling relationship with scene 2, draws the simplified representation c of scene 3 at the position given by ($X_1$, $Y_3$).

Next, the link relations and linked scene names for scene 3 are referenced, and since scene 3 has a parent child relationship with scene 31 (S1405), "1" is added to both the X and Y coordinates (S1406), and the simplified representation d of scene 31 is drawn at the position given by ($X_2$, $Y_4$) (S1408). From here on, if there is another parent-child relationship, then the simplified representation of the child scene will be drawn with only the Y coordinate different to that of the simplified representation d of scene 31 (S1409→S1407→S1408), while for a scene which has sibling relationship, the X coordinate will be reduced by one (S1410), so that the scene link composition screen generation means 1302 repeats the drawing process for all of the scenes in the scene link management information 1601 (S1403). FIG. 17 shows the scene link composition screen drawn according to the above process, based on the scene link management information 1601.

As described above, the present embodiment, is comprised of a storage means 1301 which includes a scene information storage unit 13011 for storing source materials such as video, audio, graphics, and text and scene composition information which shows how scenes are composed of said source materials and a scene link management information storage unit 13012 for storing the scene link management information made up of the scene link relation information and the link type information, a scene link composition screen generation means 1302 which retrieves the scene link management information from the editing information temporary storage means 1308, and in addition to generating the scene diagram which is a simplified visual representation of the scenes and the scene link figures which visually represent the links between scenes, determines, based on the scene link management information, the forms of the scene figure and the scene link figure and the display positions of the scene figure and the scene link figure, before generating the scene link composition screen having a least one scene figure being linked in the scene link figure, a display output means 1303 which outputs the scene link composition screen generated by the scene link composition screen generation means 1302 to the display device 1304, and an editing control means 1307 which, based on the editing request input received by the input means 1306 from the input device 1305, such as a keyboard or mouse, if the editing request input is a request to change the link management information of the scenes, changes the scene link management information stored in the editing information temporary storage means 1308, and if the editing request input is a request to update the scene link management information in the storage means 1301, updates the information so as to conform with the information in the editing information temporary storage means 1308, so that even if there is reproduction order containing many scenes or a complex reproduction order, the scene link composition screen can express the link composition and the relationships between scenes, so that it is an editing system which is easier to operate and offers the user a better understanding of the edited work than with conventional systems.

Seventh Embodiment

Figure 18:
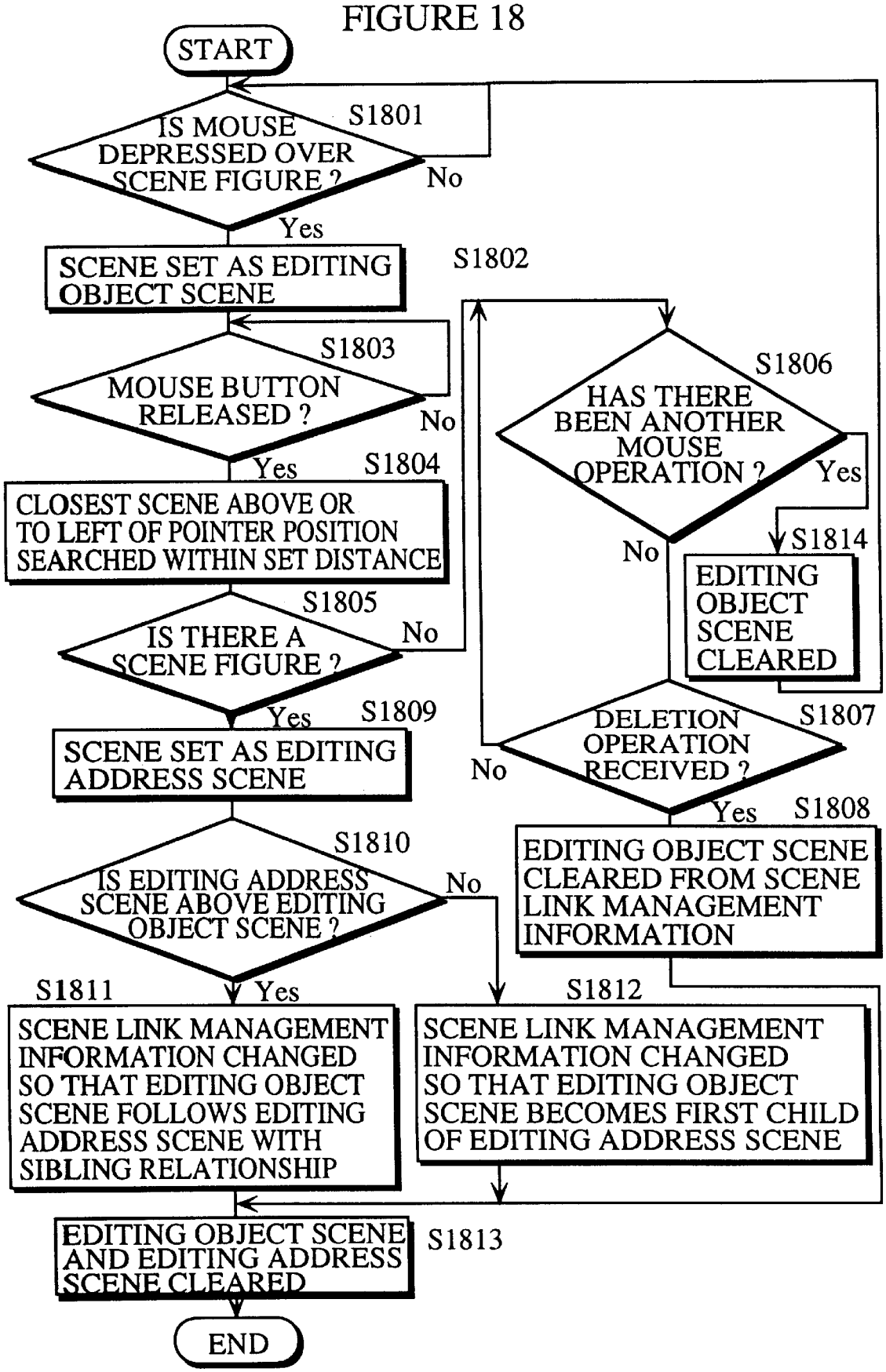
FIG. 18 is a flowchart showing the operation of the editing control means in the seventh embodiment of the present invention.
Figure 19A:
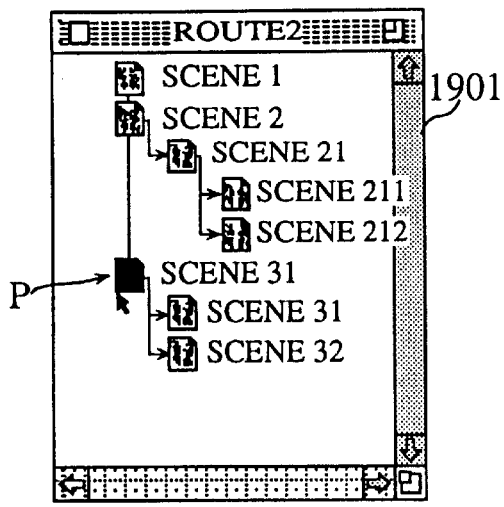
FIGS. 19(a), 19(b), 19(c), 19(d), 19(e), and 19(f) are a series of figures showing changes of the scene link composition screen according to the operation of the editing control means.
Figure 19D:
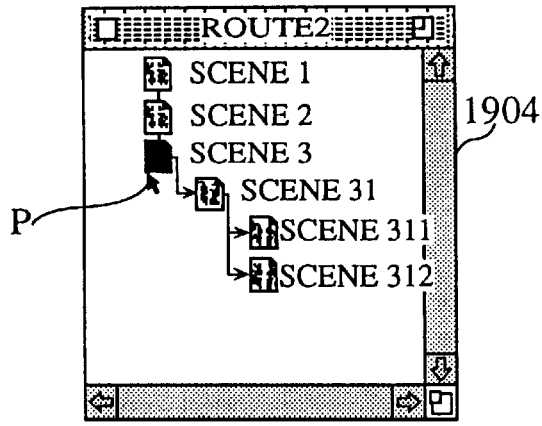
Figure 19B:
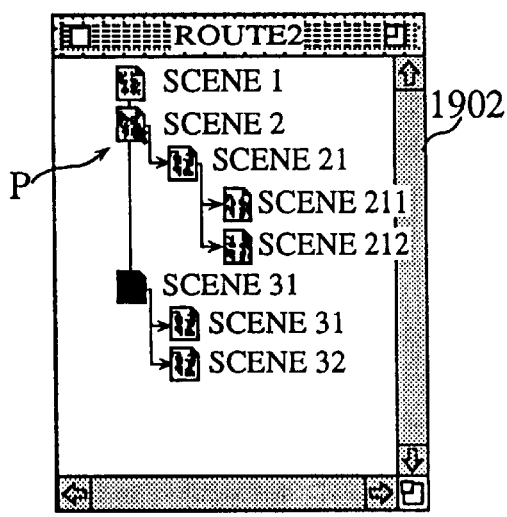
Figure 19E:
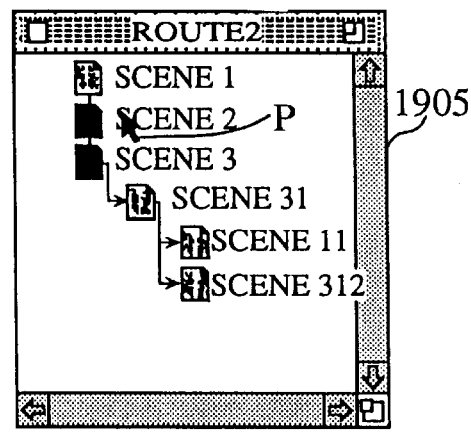
Figure 19C:
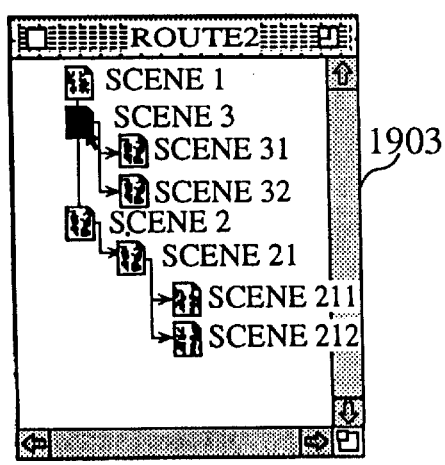
Figure 19F:
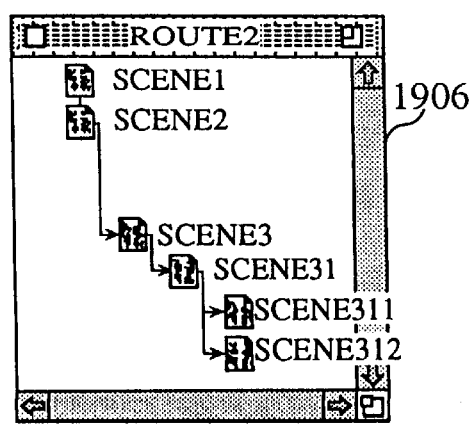

The following is an explanation of the seventh embodiment with reference to FIGS. 18, 19 and 20. The construction of this embodiment is exactly the same as that of the sixth embodiment, so that an explanation of such has been omitted.

The difference between this embodiment and the sixth embodiment is that as shown in the process shown in FIG. 18 when, as shown in 1901-1902-1903 in FIG. 19, a scene with parent-child relationships can be moved in between other scenes (here, scene 1 and 2), with all of parent-child relationships preserved, or, as shown in 1904-1905-1906 in FIG. 19, scene 3 with parent-child relationships can be moved so as to become a child of scene 2, again with all of parent-child relationships preserved.

Consequently, in this embodiment there is an extension to the process of the editing control means 1307. The following is an explanation of this process with reference to FIG. 18. Before the process begins, the scene link management information stored in the editing information temporary storage means 1308 is the same as that shown in either FIG. 20(*a*) or 20(*c*), and therefore represents the scene link composition for the initial screen shown in either FIG. 19(*a*) or 19(*d*). In this state, the user depresses the mouse button on the input device 1305, and by making the selection of scene 3 shown by the pointer P (S1801), so that scene 3 is set in a special register used for the scene being edited (S1802).

Next the user moves the pointer P towards scene 2 as shown in either FIG. 19(*b*) or FIG. 19(*e*), and then releases the mouse button (S1803), at which point the system will search for a scene figure within a set distance above and to the left of the dropped pointer position (S1804). If the closest scene is above the pointer then a sibling relationship is determined, while if the closest scene is to the left of the pointer, a parent-child relationship is determined, so that S1804 is a process for searching for a the link address which is higher up than the scene being moved. If there is a scene figure which is this kind of link address, then such scene (Scene 1 in the illustrated example) is set as the editing address scene (S1809). However, if editing address scene 1 is placed above editing object 3 (S1810), then the content of the scene link management information 1601 stored in the editing information temporary storage means 1308 is changed so that editing address scene 1 and editing object 3 have a sibling relationship. On the other hand, if editing address scene 1 is placed to the left of editing object 3, then the content of the scene link management information 1601 is changed so that editing object 3 is set as the child of editing address scene 1. The scene link management information after this conversion is shown in FIGS. 20(*b*) and (*d*). The information which is changed is the link relationship and the linked scene name. In this case, as can be seen from FIGS. 20(*b*) and 20(*d*), even if scenes 1 and 3 are linked to a number of child scenes, this information will not be changed. By doing so, once the content of the scene link management information 1601 has been changed, since the scene link composition screen generation means of FIG. 14 will generate a figure based on this changed information, the display of the display device will change to the post-editing scene link composition screen shown in FIG. 19(*c*) or 19(*f*).

Here, the editing control means, on completing the processes S1811, S1812 deletes the set editing object scene and editing address scene (S1813). On the other hand, if in S1805 there is no scene which should be set as the editing address scene, the system will instead wait for the next mouse operation (S1806), and delete the scene set as the editing object scene (S1814), returning to a state wherein it waits for the next editing indication (S1801). If it receives a delete instruction in place of a next mouse action (S1807), the editing control means will delete the editing object scene from the scene link management information (S1808), and end the process.

By means of the above embodiment, the scene link composition screen can be directly edited, so that the reproduction order of the scenes and the link relations between scenes can be decided by the user, thereby making this an editing system of superior operation.

Eighth Embodiment

Figure 21:
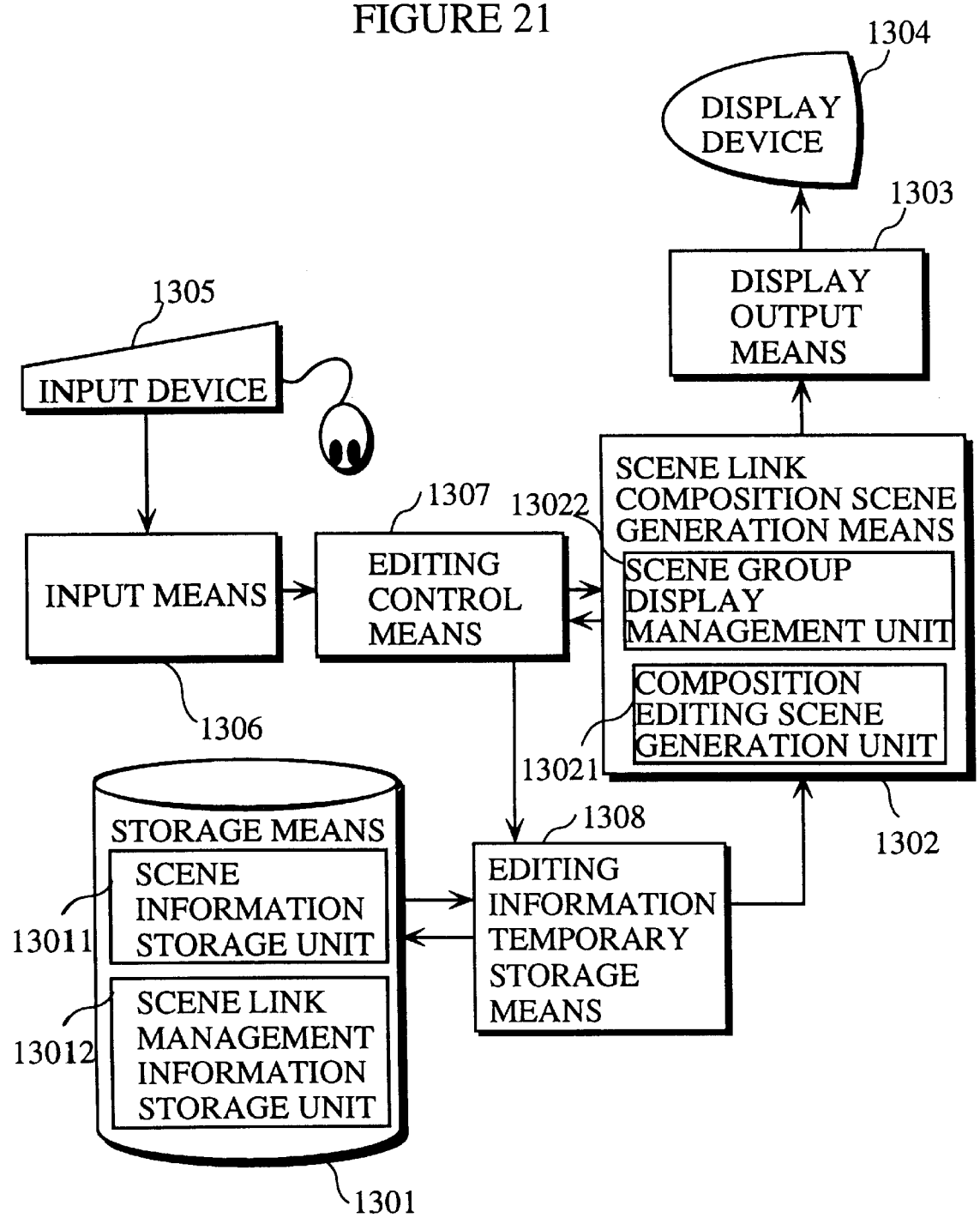
FIG. 21 is a block diagram showing the construction of the multimedia data editing device in the eighth embodiment of the present invention.

The following is an explanation of the seventh embodiment with reference to FIG. 21. The construction of this embodiment is fundamentally the same as that shown in FIG. 13, except that the scene link composition screen generation means 1302 includes a composition screen editing unit 13021 and a scene group display management unit 13022.

Figure 22:
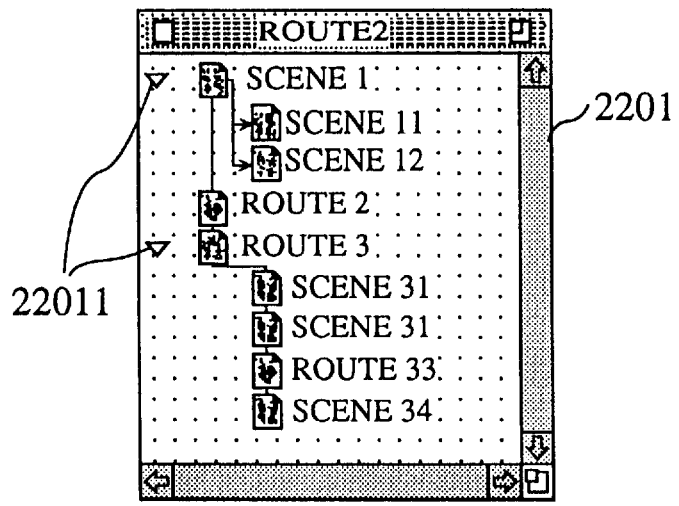
FIGS. 22(a), 22(b), 23(a), and 23(b) are figures showing scene link composition screens in eighth embodiment of the present invention.
Figure 22:
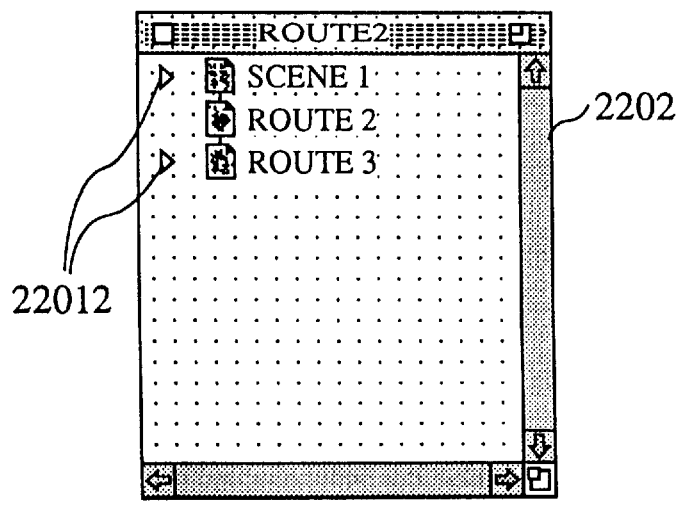
Figure 23:
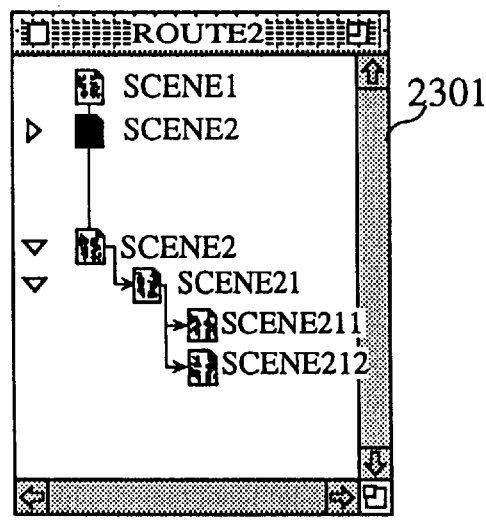
Figure 23:
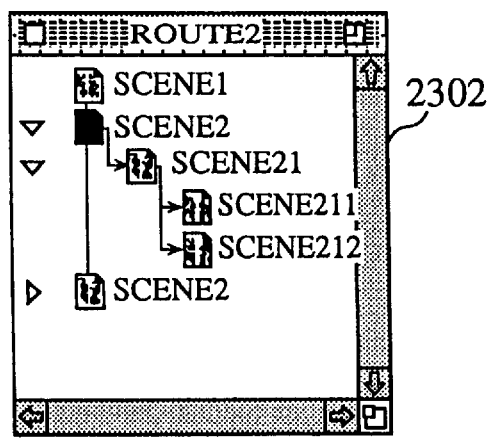

The scene link management information storage unit 13012 in the storage means 1301 stores the scene level information which describes the inter-level relationships between scenes, in addition to the link relation information and the link type information as before. The scene group display management unit 13022, based on the scene link management information retrieved from the storage means 1301 via the editing information temporary storage means 1308, expresses scenes which have a sub level as scene representation figures and stores the display state information for the various scenes with sub levels. For example, in the scene link composition screen 2201 shown in FIG. 22, then the display shown goes as far as the sub levels for between scene 1 and route 3, while in the scene link composition screen 2202, then the screen figures for the sub level screens are hidden and are instead expressed by representation figures. In order to show the display state, marks such as those numbered 22011 and 22012 are placed to the left of the scene figures. Downward pointing arrows such as 22011 show that the scene figure to which the representation figure belongs is being displayed as far as its sub levels, while arrows pointing to the right such as 22012 show that the scene figure in question has its sub levels hidden. Since the composition of the sub levels for scene 1 and for route 3 are different, the representation figures used for visually representing them are also different. Furthermore, the scene group display management unit 13022 will manage the display, based on the editing request input from the editing control means 1307, so that when simultaneously displaying in several places a same scene which has a sub level, after displaying the sub levels for one of the scenes, the other scene will be displayed using a representation figure, and the scene link composition screen generation means 1302 will generate a scene link composition screen composed wherein at least one scene figure is linked by a scene link figure. For example, as shown in FIG. 23, when displaying scene 2 which has sub levels twice on the same screen, then, as shown in the scene link composition screen 2302 in FIG. 23(b), the sub levels are displayed for the upper scene figure of scene 2 while the sub levels for the other scene figure for scene 2 are hidden. Here, if the sub levels are displayed for the lower scene figure of scene 2, then as can be seen in FIG. 23(a), the sub levels for the upper scene figure for scene 2 are hidden.

Figure 24A:
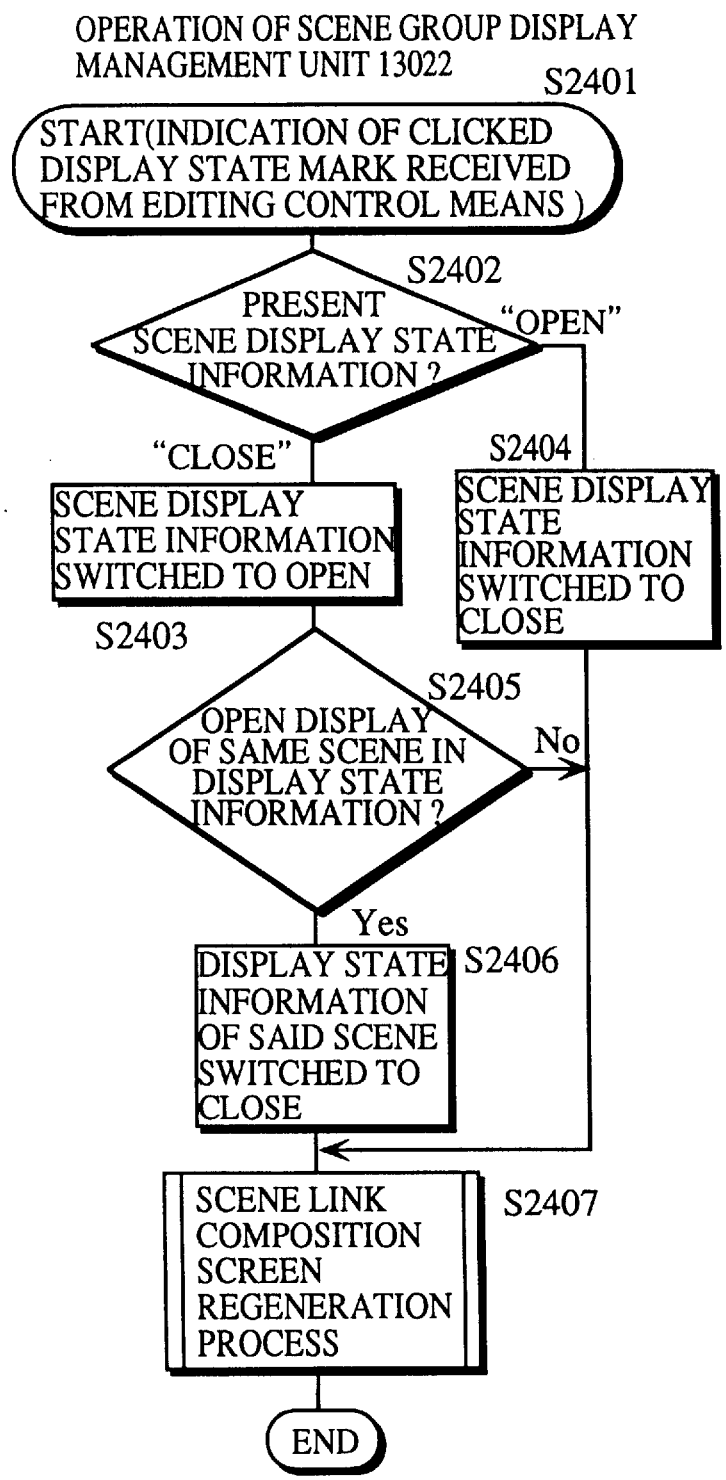
FIG. 24(a) is a flowchart showing the operation of the scene group display management unit.

FIG. 24(a) is a flowchart for the operation of the scene group display management unit 13022. This flowchart starts with the mouse pointer selecting the display state mark 22012 which is an arrow pointing right (S2401). Next, the scene group display management unit 13022 references the scene display state information in the editing information temporary storage means 1308, and determines whether the scene figures for sub levels are to be displayed ("open") or are to be hidden ("close"), before switching the state from "open" to "close", or from "close" to "open", and rewriting the scene display state information accordingly (S2403, S2404). If the scene display state information is changed to "open" here, and there are other scene figures for the same scene which are "open" in the display state information (S2405), then the process advances to S2406, so that the "open" state is cancelled and changed to "close". Once the above process is complete, the scene group display management unit 13022 calls the composition screen editing unit 13021 and has the reproduction of the scene link construction screen processed (S2407).

Figure 24B:
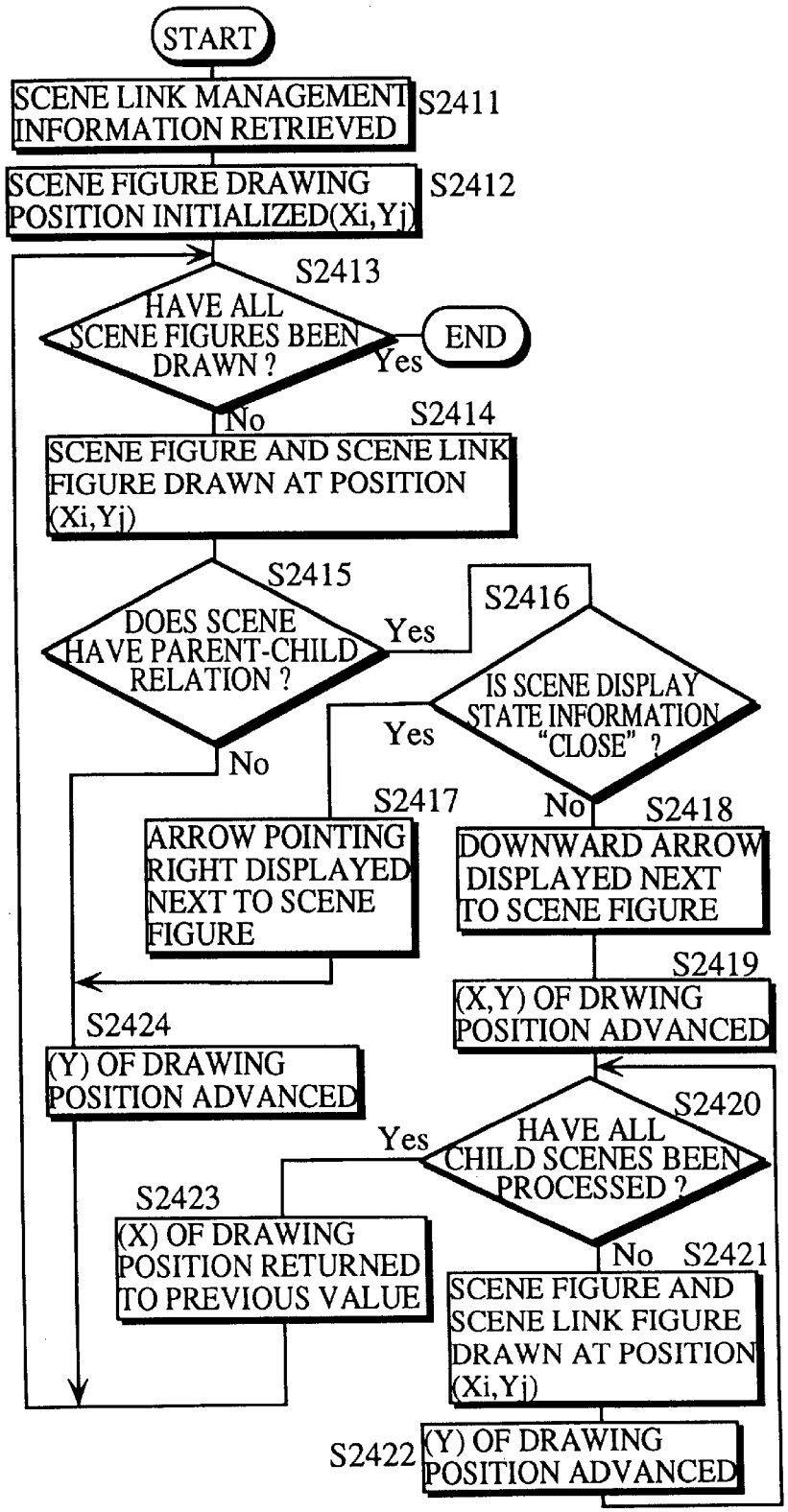
FIG. 24(b) is a flowchart showing the scene link composition screen reproduction process.

FIG. 24(b) shows the details of the process in S2407. The operation of the composition screen editing unit 13021 is fundamentally the same as that of the scene link composition screen generation means shown in FIG. 14, except that the process for the scene display state information has been added. The following is a description of this process. First, the scene link management information is read from the editing information temporary storage means 1308 (S2411). The scene link management information retrieved here naturally includes the scene display state information.

Next, if there is a sibling relationship the process S2412→S2413→S2414→S2415→S2424→S2413 is repeated, while if there is a parent-child relationship the process S2415→S2418→S2419→S2421→S2422→S2420 . . . →S2423→S2413 is repeated, thereby generating the scene link composition screen. In this case, when drawing scenes linked by a parent-child relationship, it references the scene display state information (S2416), and if it finds the word "close", draws an arrow pointing right to the left of the scene figure (S2417) and does not draw the scene figures for the child scenes, instead augmenting the Y coordinate of the drawing position by 1 (S2424) and performing the drawing of the scene figure of the next scene with a sibling relationship (S2414). On the other hand, if in S2416 it finds the word "open", it draws an downward arrow to the left of the scene figure (S2418) and draws the scene figures for the child scenes (S2421).

By adding a composition screen editing unit 13021 and a scene group display management unit 13022 to the scene link composition screen generation means 1302 in the way described above, then since groups of scenes can be represented by the representative screen figures of different types, complicated display screens can be avoided and the accidental rupturing of the links between scenes due to operational errors, even when there are a number of scenes connected in inter-level relationships or when a same scene is used in different routes.

Ninth Embodiment

Figure 25:
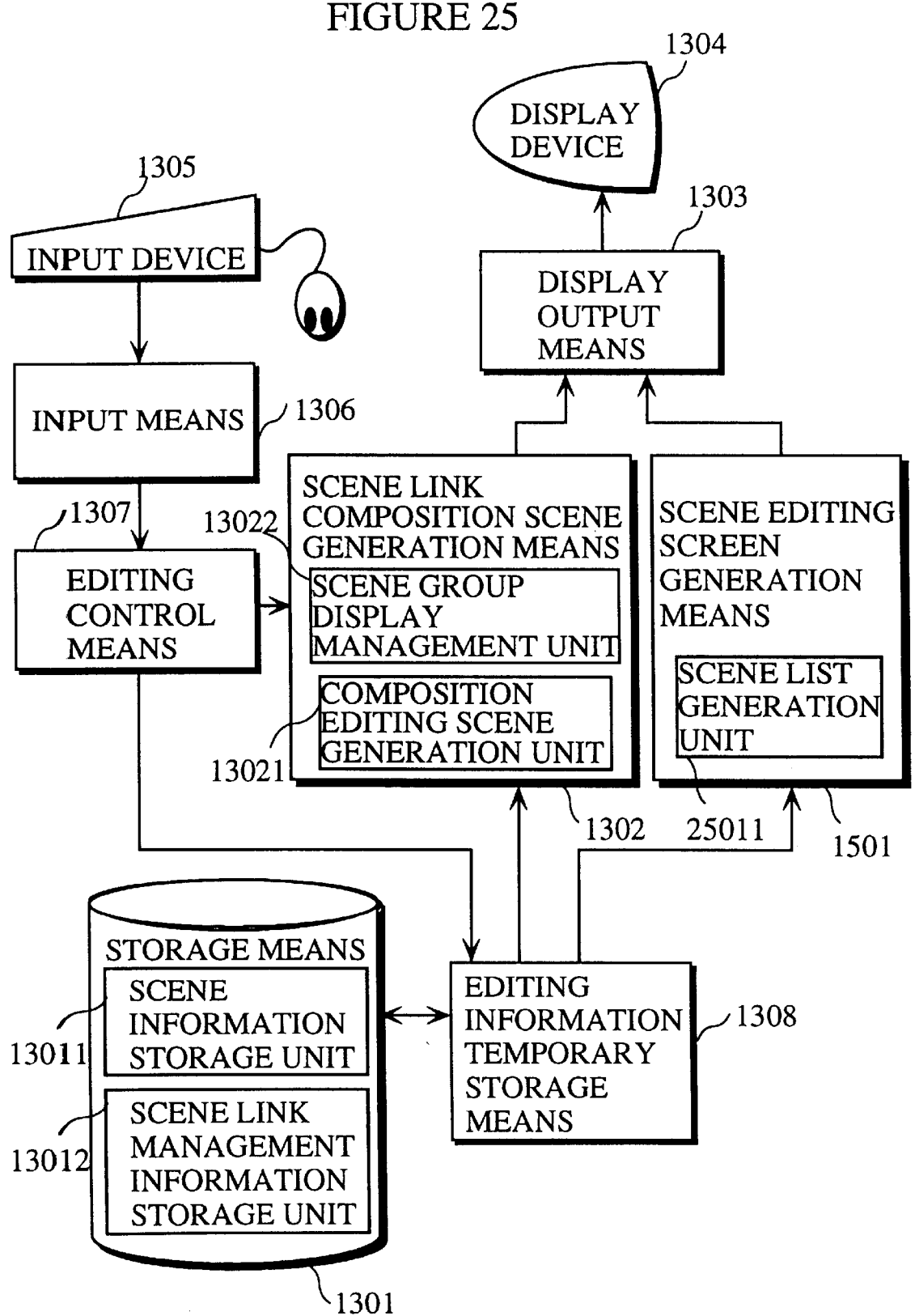
FIG. 25 is a block diagram showing the construction of the multimedia data editing device in the ninth embodiment of the present invention.

FIG. 25 is a block diagram showing the construction of the multimedia data editing device in the ninth embodiment of the present invention. This device is fundamentally the same as that shown in FIG. 21, except that the scene editing screen generation means 2501 has been provided as a new construction element.

Figure 26:
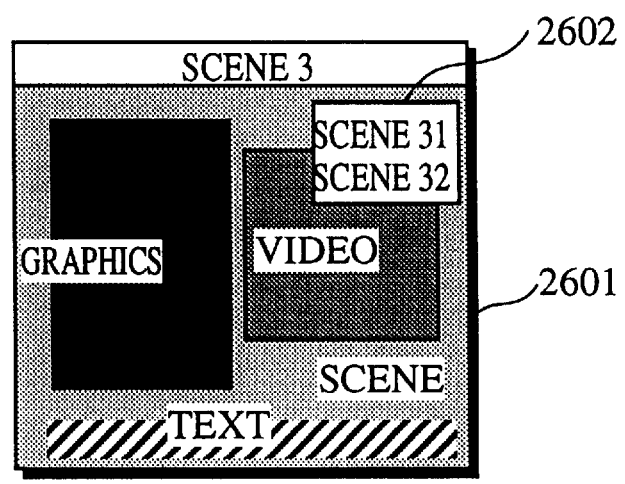
FIG. 26 is a figure showing the scene editing screen.

The scene editing screen generation means 2501 retrieves the scene information from the editing information temporary storage means 1308 and generates the scene editing screen for editing the scenes. 2601 in FIG. 26 shows an example of the scene editing screen, which allows the user to edit the layout and such of the source materials on the screen.

The display output means 1303 receives outputs from the scene link composition screen generation means 1302 and from the scene editing screen generation means 2501, and outputs the screen link composition screen and the scene editing screen to the display device 1304.

The scene list generation unit 25011 in the scene editing screen generation means 2501 generates the list of scenes linked to the present scene, based on the scene link management information retrieved from the editing information temporary storage means 1308. The scene editing screen generation means 2501 then outputs the scene editing screen and the scene list to the display output means 1303. For the example of the scene link composition shown as the scene link composition screen 1701 in FIG. 17, if scene 3 is edited, then the scene list such as that shown by 2602 in FIG. 26 will be displayed on the scene editing screen. Since scenes 31 and 32 are child scenes for scene 3, the names of these scenes are given in the scene list 2602.

Figure 27:
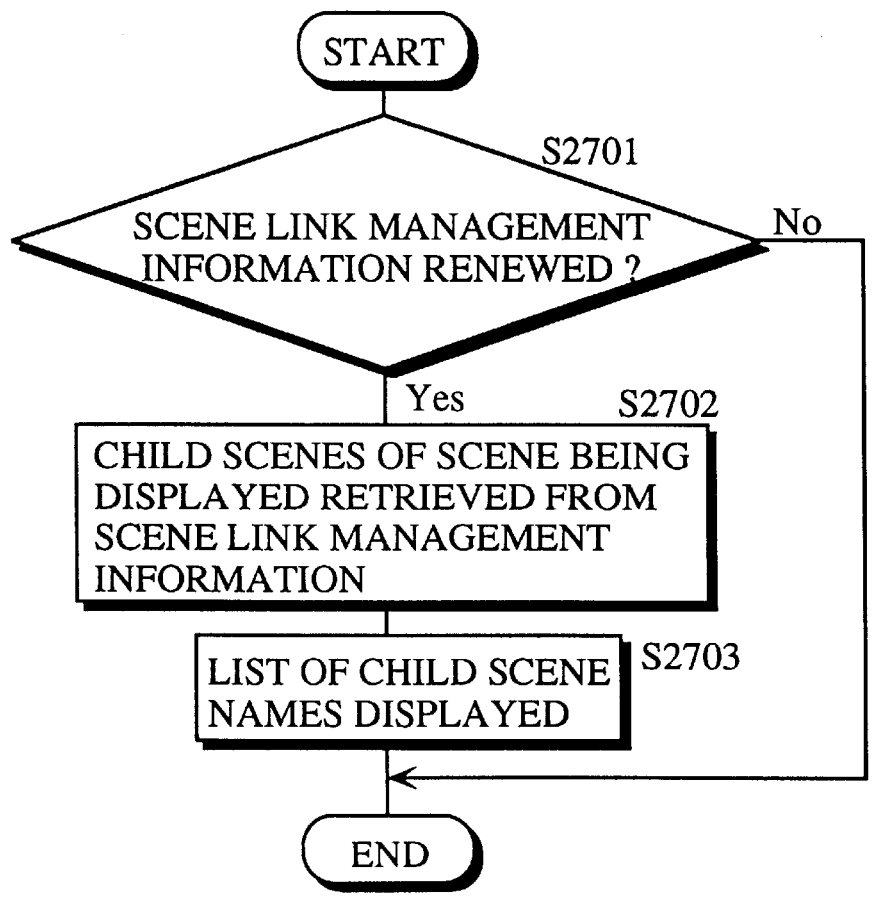
FIG. 27 is a flowchart showing the operation of the scene list generation unit.

FIG. 27 is a flowchart for the operation of the scene list generation unit 25011. Once the scene list generation unit 25011 is activated by the scene editing screen generation means 2501, it commences its operation. Then, before the scene editing, if there are any changes in the content of the scene link composition so that the scene link management information has been updated (S2701:Yes), the child scenes for the scene currently being displayed are retrieved from this updated information (S2702) and a list of child scene names is generated (2602 in FIG. 26), before this list is outputted to the display output means (S2703).

By comprising a scene editing screen generation means 2501, which is connected to the editing information temporary storage means 1308 and which includes a scene list generation unit 25011, for outputting a scene editing screen and a display output means 1303 for receiving an output from the scene link composition screen generation means 1302 and from the scene editing screen generation means 2501 and outputting the screen link composition screen and the scene editing screen to the display device 1304, the device of the present embodiment allows the user to easily know which scenes are linked to the scene currently being edited. (Device shown in FIG. 28)

Figure 28:
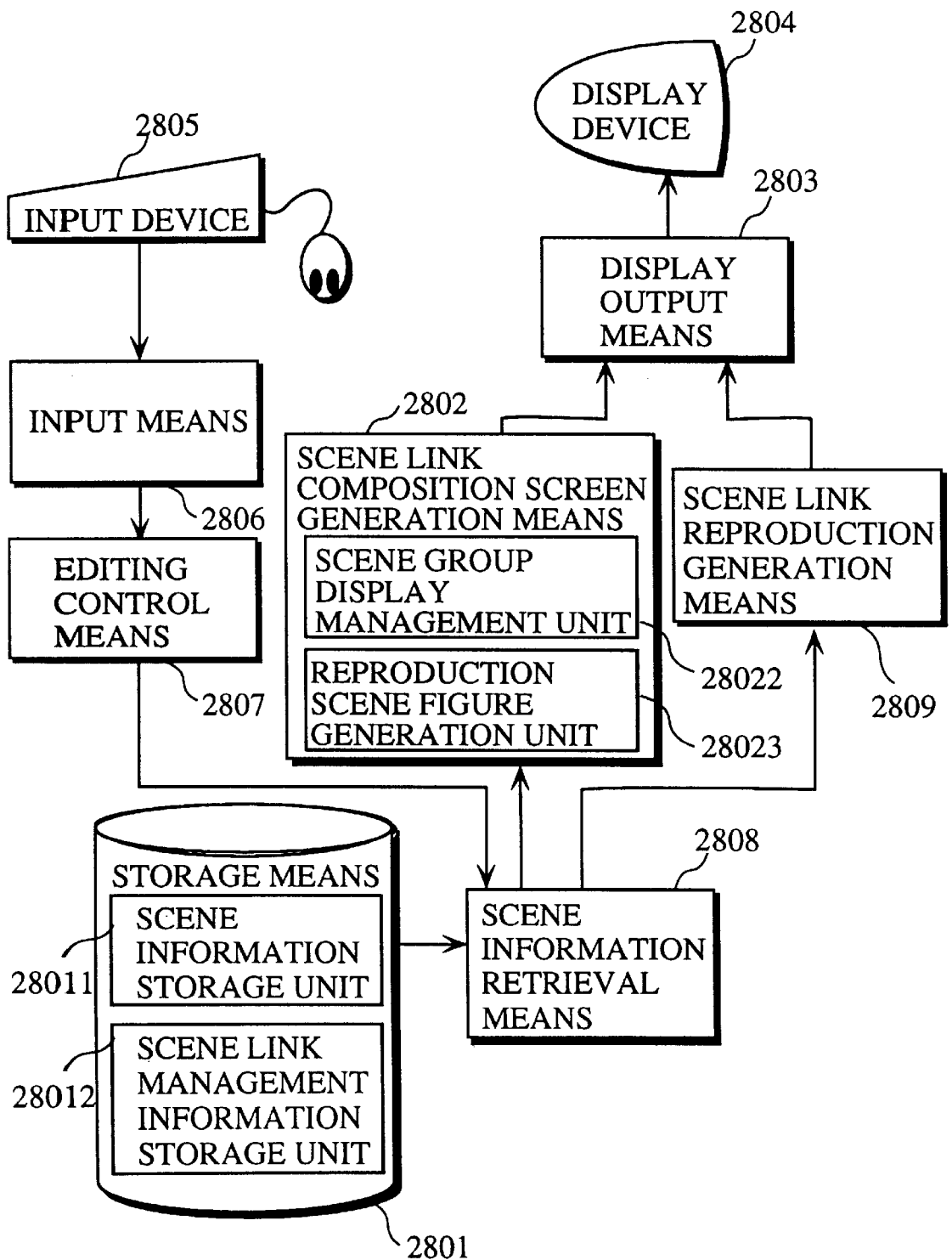
FIG. 28 is a figure showing a device for reproducing the edited scene link composition screen and scene figures.

FIG. 28 shows a device for reproducing the scene link composition screen and the scene figures edited by the editing devices of FIGS. 21 and 25. This reproduction device is functionally included in the devices of both FIG. 21 and FIG. 25, but for ease of explanation has been removed from those devices and shown separately in FIG. 28.

In FIG. 28, the storage means 2801 is the same as the storage means 1301 in FIG. 21, the scene information storage unit 28011 is the same as the scene information storage unit 13011 in FIG. 21, the scene link management information storage unit 28012 is the same as the scene link management information storage unit 13012 in FIG. 21, the scene group display management unit 28022 is the same as the scene group display management unit 13022 in FIG. 21, the display output means 2803 is the same as the display output means 1303 in FIG. 21, the display device 2804 is the same as the display device 1304 in FIG. 21, the input device 2805 is the same as the input device 1305 in FIG. 21, the input means 2806 is the same as the input means 1306 in FIG. 21, and the editing control unit 2807 is the same as the editing control unit 1307 in FIG. 21, so the construction described above is the same as that in FIG. 21.

The difference with FIG. 21 is that the device in FIG. 28 also comprises a scene information retrieval means 2808 which is connected to the storage means 2801 and which receives instructions from the editing control means 2807, a scene reproduction screen generation means 2809 which is connected to the scene information retrieval means 2808 and which generates and outputs the scene reproduction screen, a scene link composition screen generation means 2802 which is connected to the scene information retrieval means 2808, which includes a scene group display management unit 28021 and a reproduction scene figure generation unit 28023, and which generates and outputs the scene link composition screen, and a display output means 2803 for receiving screen displays output from the scene link composition screen generation means 2802 and from the scene reproduction screen generation means 2809 and outputting them to the display device 2804.

The scene information retrieval means 2808 receives instructions from the editing control means 2807, and retrieves the scene information and the scene link management information which are stored in the scene information storage unit 28011 in the storage means 2801.

The scene reproduction screen generation means 2809 generates the scene reproduction screen for reproducing the scenes, based on the scene information retrieved by the scene information retrieval means 2808, and outputs it to the display output means 2803. The scene reproduction screen is composed of video, graphics and text which are laid out and displayed such as in the example screen 1505 shown in FIG. 15.

The scene link composition screen generation means 2802 generates the scene link composition screen based on the scene link management information retrieved from the scene information retrieval means 2808, while the reproduction scene figure generation unit 28023 in the scene link composition screen generation means 2802 obtains the information for the scenes to be reproduced from the scene information retrieval means 2808 and visually converts the scene figures and scene link figures corresponding to the scenes generated by the scene reproduction screen generation means 2809, based on the scene link composition screen, with the scene link composition screen generation means 2802 outputting the converted scene link composition screen to the display output means 2803. For the example shown in FIG. 17, when scene 3 is presented as the scene representation screen, the scene figure representing scene 3 is highlighted.

The display output means 2803 outputs the scene link composition scene generated by the scene link composition screen generation means 2802 and the scene reproduction screen generated by the scene reproduction screen generation means 2809 to the display device 2804. That is, the scene reproduction screen 1505 and the scene link composition screen 1701 are displayed simultaneously by the display device 2804.

As described above, by means of the present embodiment, since the scene reproduction screen and the scene link composition screen are displayed simultaneously, then when reproducing the scenes, it is very easy for the user to know which scene is currently being reproduced.

Tenth Embodiment

Figure 29:
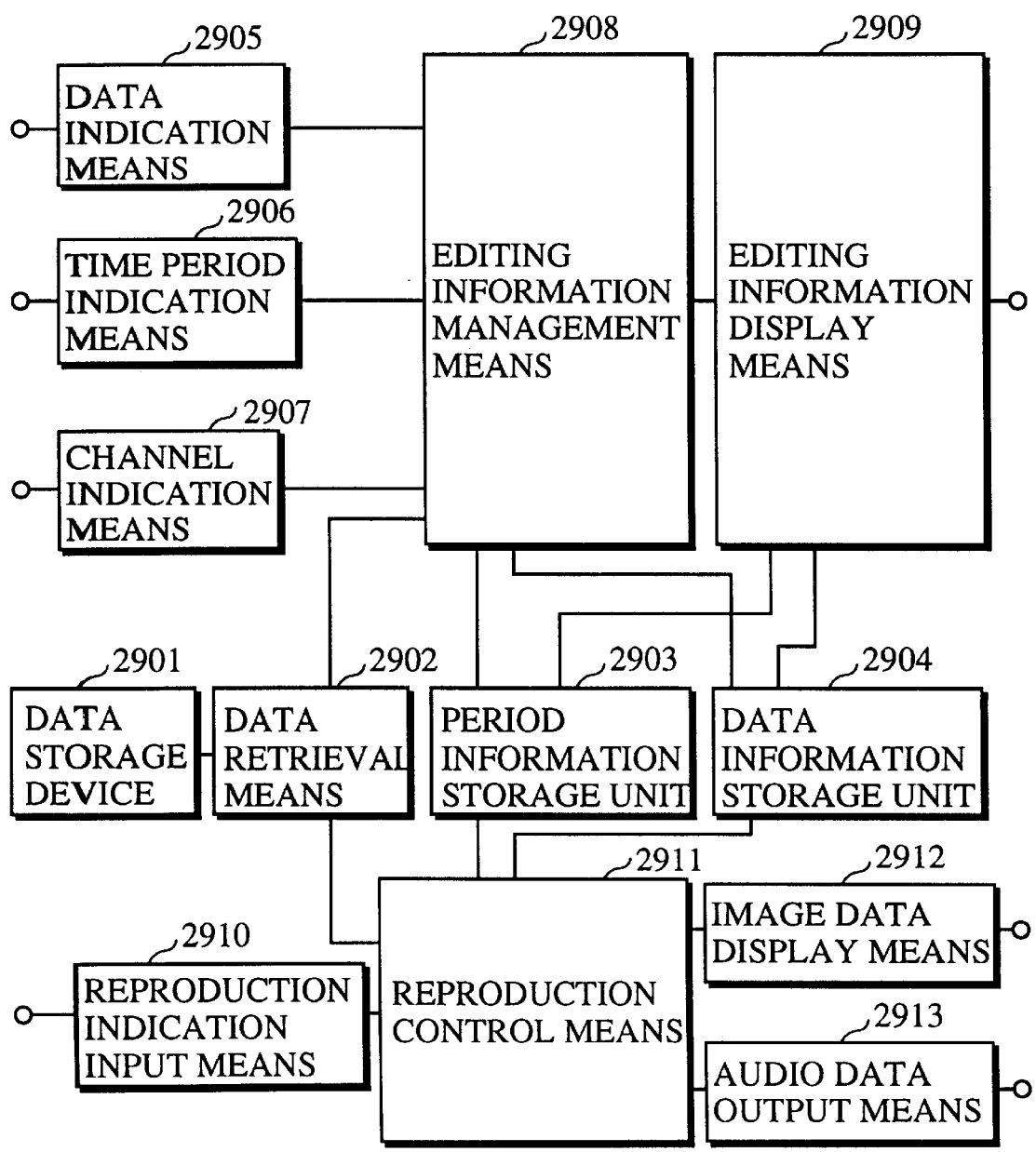
FIG. 29 is a block diagram showing the construction of the multimedia data editing device in the tenth embodiment of the present invention.

FIG. 29 is a block diagram showing the construction of the multimedia data editing device in the tenth embodiment of the present invention.

The editing device in this embodiment differs from those in previous embodiments in that it provides a logical synchronization method for when adding multimedia data which has a different reproduction time to the multimedia data on other channels.

In FIG. 29, 2901 is the data storage device for storing multimedia data, 2902 is the data retrieval means for retrieving the data added information such as the data itself or the data reproduction period from the data storage device 2901, and 2903 is the period information storage unit for storing the time period information specifying the reproduction time of the multimedia data. An example of the time period information stored by the period information storage unit 2903 is shown in FIG. 30(a). In this example it can be seen that one of the two time periods has a duration of 15 minutes while the other has a duration of 20 minutes.

2904 is the data information storage unit for storing the channel number, the period number, the address showing the position where the data is stored in the data storage device 2901, and the reproduction time which is the necessary time period for one reproduction of one piece of data. This data information is referenced taking into account the time period information, with data being reproduced on two channels during period number 1, and on three channels during period number 2.

Here, if the reproduction base time in the data information is zero, this means that the data represents a medium whereby all of the data is represented in one (unchanging) image, such as a static image data or text data. Conversely, reproduction base times which take a given time, such as 15 minutes or 20 minutes, show that the medium is one wherein a certain time is necessary for reproduction, such as video data or music data. Also, the remaining time processing number is a number which represents the process to be used for dealing with the time which remains when the reproduction time has been extended. The table in FIG. 31(c) shows a list of remaining time processing numbers corresponded with the process they represent, with this table being stored by the editing information management means 2908 described below. 2905 is the data indication means which indicates, out of all the data, which data is to be edited. 2906 is the time period indication means for indicating the reproduction time of the data being edited. 2907 is the channel indication means for indicating the channel for reproducing the data being edited. 2908 is the editing information management means which adds the reproduction time indicated by the time period indication means 2906, the channel indicated by the channel indication means 2907, and data address indicated by the data indication means 2905 to the data information storage unit 2904 and, in addition to retrieving the reproduction time for the data indicated by the data indication means 2905 from the data retrieval means 2902, retrieves the period time corresponding to the time period specified by the time period indication means 2906 from the period information storage unit 2903, compares the data reproduction time with the period time and changes the period time stored by the period information storage unit 2903 to the data reproduction time if the data reproduction time is the longer of the two. The control process executed by the editing information management means 2908 is shown by the flowchart in FIG. 32 and is described in more detail below. 2909 is the editing information display means which, when the editing information management means updates the content of either the period information storage unit 2903 or the data information storage unit 2904, composes the information for visually displaying the editing information of the multimedia data from the content of the period information storage unit 2903 and the data information storage unit 2904. 2910 is the reproduction indication input means for inputting an indication for reproducing the edited multimedia data. 2911 is the reproduction control means which, once an indication for reproducing the edited multimedia data is received by the reproduction indication input means 2910, retrieves the period information stored by the period information storage unit 2903 and the data in the data storage means at the address stored by the data information storage unit 2904 via the data retrieval means 2902, with the operation of this reproduction control means 2911 shown in FIG. 33 which is described below. 2912 is the image data display means for processing the image data for display, out of the data retrieved from the reproduction control means 2911, and 2913 is the audio data display means for processing the audio data for output, out of the data retrieved from the reproduction control means 2911.

In reality, a number of other construction elements are necessary, such as the unit for displaying a list of data, an input device, and an output device but, since these elements are not the gist of the present invention, they have been omitted.

Figure 32:
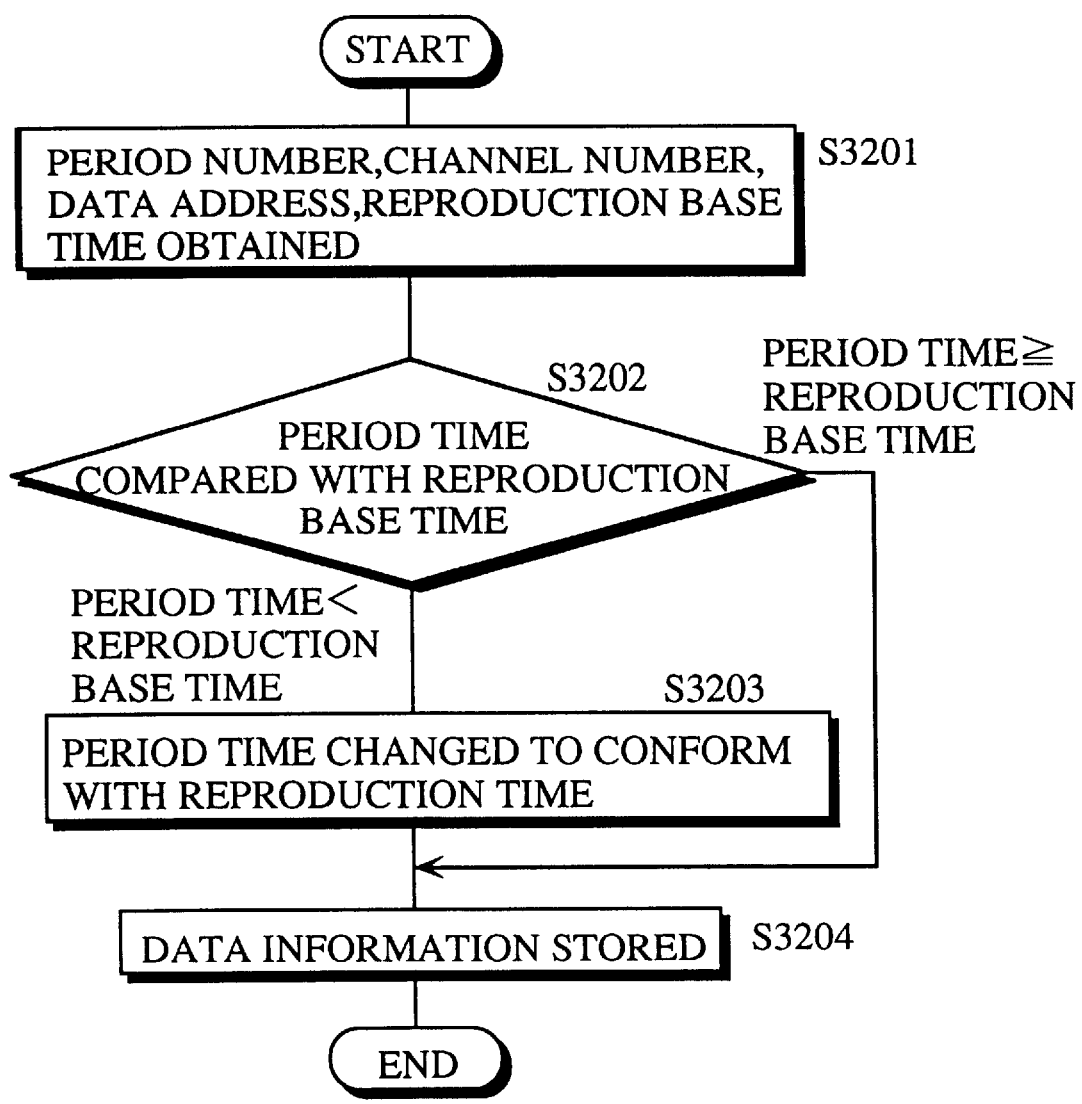
FIG. 32 is a flowchart showing the operation of the editing information management means.

The following is an explanation of the operation of the above construction, focusing first of all on the operation of the editing information management means 2908 when the user adds new multimedia data to a work, with reference to FIG. 32. The flowchart in FIG. 32 begins when the user makes an operation to add new multimedia data. If, for example, the user make an operation to add the video data which has a 20 minute reproduction time, then the editing information management means 2908 will obtain the time period from the time period indication means 2906, the channel number from the channel indication means 2907, the address of the data from the data indication means 2905, and the data to be added via the data retrieval means (S3201). Next, the period time corresponding to the time period specified by the time period indication means 2906 is retrieved from the period information storage unit 2903 and is compared with the data reproduction time (S3202). When the result of the comparison is that the data reproduction time is longer than the period time, then the editing information management means 2908 changes the period time so as to equal the data reproduction time (S3203). FIG. 30(c) shows an example where the time of period number 1 is increased from 15 to 20 minutes by means of the above process. After this, the channel number, the address, the period number, the reproduction time for the data to be added are written into the data information in the data information storage unit 2904 (S3204). FIG. 30(d) shows the information for the added data in the column which is highlighted using a thick line. If, in S3202, the result of the comparison is that the data reproduction time is shorter than the period time, then the data reproduction time is extended without reducing the period time. Here, it can be seen in the data information in the table in FIG. 30(d) that remaining time process numbers are also recorded, with these process number being set beforehand by the user, so that the editing information management means 2908 writes these process numbers along with the data information in the data information storage unit 2904. The method for the setting of the remaining time process numbers can be the uniform setting of the number 0 as shown in the diagram, or depending on the data, for the case of music data 0 is set for repeating the music from the beginning, for video data 1 is set so that there is for no output, while for static image data or text data 3 is set so that the display is prolonged. In such a case, the editing information management means 2908 needs to determine the kind of data being edited before selecting the appropriate remaining time process number.

Figure 33:
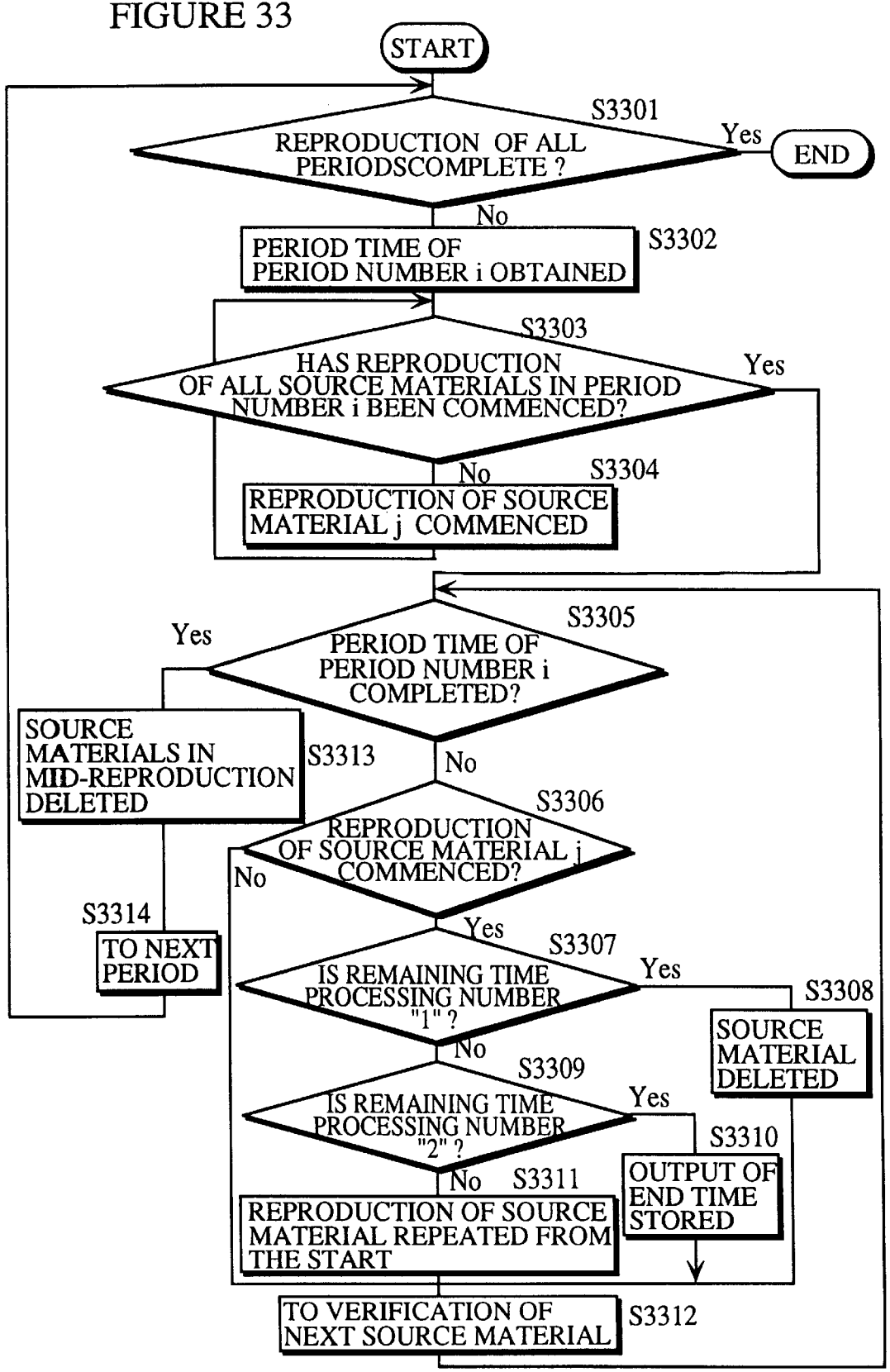
FIG. 33 is a flowchart showing the operation of the reproduction control means.

Next, the following is an explanation of the operation of the reproduction control means 2911 with reference to the flowchart in FIG. 33. This flowchart begins when the user inputs a reproduction indication via the reproduction indication input means 2910.

It should be noted that the multimedia to be reproduced here is that shown in FIGS. 30(c) and 30(d), so that the 20 minute video data has been added to period number 1. FIG. 31(b) is a visual representation of the flow of the reproduction of this multimedia data with time. Also, FIG. 31(a) is a visual representation of the flow of the reproduction of this multimedia data before the addition of the video data 1. The following operation will be described with reference to the flow in FIG. 31(b).

Once the reproduction indication is input via the reproduction indication input means 2910, the reproduction control means 2911 retrieves the period time for period number 1 from the period information storage unit 2903 (S3302), and retrieves the data via the data retrieval means 2902 using the data address of the information in period number 1 received from the data information storage unit 2904. The audio data output means 2913 processes the audio output of the retrieved music data 1, and the image data output means 2912 processes the static image data 1 and the video data 1 output of the retrieved music data 1 to produce a screen display and the reproduction of the source materials is begun (S3303, S3304). For the 20 minute time period until the period time for period number 1 has elapsed (S3305), the reproduction time for each of the source materials is observed (S3306), and if the time period exceeds the reproduction time of any of the media, then the remaining time process number for that media is referenced (S3307, S3309) and an appropriate reproduction method is selected so that the reproduction time comes to twenty minutes (S3308, S3310, S3311). For the example shown in FIG. 31(b), once the reproduction base time of 15 minutes is exceeded for the music data 1, in keeping with the remaining time process number 0, the music is repeated from the beginning until the reproduction time has reached 20 minutes. Once the period time of period number 1 is complete, then the source materials are deleted (S3313) and the period time for period number 2 is retrieved from the period information storage unit 2903 (S3314), and the data for period number 2 is retrieved via the data retrieval means 2902 using the data address of the information in period number 2 received from the data information storage unit 2904, and the process from S3302 to S3312 is repeated. However, for the period time of the period number 2, the audio data output means 2913 processes the audio output of the retrieved music data 2, and the image data output means 2912 processes the text data 1 and the video data 2.

The process described above is repeated for all the following period numbers (S3301) and on completion the reproduction control operation is then terminated.

In this way, even if data which has a different reproduction time is added on another channel, the system can ensure there are no synchronization slips with the reproduction of the data preceding or following the inserted data. There are also no slips for data which is reproduced synchronized to the added data and data which is reproduced before or after them. Furthermore, even if the reproduction time of data is changed, it is still possible to know the reproduction base time.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being include therein.

What is claimed is:

1. A multimedia presentation device, comprising:

information storage means for storing data in the form of information blocks and control information data for managing the information blocks, including a multi-level composition data showing how the information blocks are linked to each other, wherein;

said multi-level composition data provides linkage of a plurality of information blocks which have sibling relations and parent-child relations, some of the information blocks further have a plurality of child information blocks, among the information blocks which are parents in a parent-child relation, some are linked so that, even without a user making a selection, a display can advance to a child information block by means of an automatic default mode when a predetermined time period has elapsed, and said information blocks include at least one of a type one media, such as video, sound and graphics, and a type two media, which include graphic button media elements simulating user control switches which further contain link information for moving from a present information block to another information block;

reproduction control information management means for retrieving the control information data, including the multi-level composition data of the information blocks, from the information storage means;

indication input means for inputting an indication by the user;

information reproduction means for retrieving one information block from the information storage means and reproducing it, visually and aurally presenting to the user any of type one media and any of type two media included in the retrieved information block;

operation time management means for measuring a time of reproduction and presentation of a new information block and for determining whether there is an indication from the indication input means between a start of presentation by the information reproduction means and an expiration of the predetermined time period;

reproduction control means for controlling the information reproduction means so as to retrieve, when there is an indication from the indication input means within the predetermined time period after the start of presentation, an indicated information block from the information storage means, and so as to retrieve, when the operation time management means determines that there is no indication within the predetermined time period after the start of presentation, an information block which is a child information block which can be automatically replaced for an information block currently being presented; and movement address display control means for controlling the information reproduction means, when a child information block is to be reproduced by means of the automatic default mode, so as to display, before presenting the child information block, a button media element out of the group two media which shows said child information block in a visually different display format relative to other button media elements, in a same manner as when said button is indicated by a user.

2. The multimedia presentation device of claim 1, wherein the information storage means stores an automatic default mode condition for each parent information block which has a child information block which can be automatically defaulted and the reproduction control information management means includes:

default condition storage unit for retrieving an automatic default condition from the information storage means and storing it; and set time rewriting unit for referring, when a new information block reproduced by the information reproduction means has a child block which can be automatically defaulted, to an automatic default condition stored by the storage unit and rewriting a new predetermined time period for the operation time management means.

3. The multimedia presentation device of claim 2, wherein the information blocks have a predetermined route for tracing a course by means of automatic defaulting between upper level information blocks and lower level information blocks.

4. The multimedia presentation device of claim 1, wherein the information storage means stores automatic default order data, for each parent information block which has a number of child information blocks which can be automatically defaulted, said automatic default order data showing which child information block should be retrieved next by means of automatic default, and the reproduction control information management means includes:

a discharge order storage unit for retrieving the automatic default order data from the information storage means and storing it; and a next information block indication unit for referencing, when during reproduction an information block is to be automatically default, a content of the discharge order storage unit and indicating to the reproduction control means a next information block to be reproduced.

5. The multimedia presentation device of claim 1, wherein the groups of information blocks each include at least one route made up of a grouping of information blocks which are to be automatically reproduced in a predetermined order which does not depend on any operation by the user;

the reproduction control information management means retrieves information relating to the route from the information storage means and stores it;

the indication input means includes a presentation switching operation unit for switching from an information block currently being presented to one of a preceding information block, a following information block, and a parent information block; and the reproduction control means contains a determination unit for referencing, once a presentation switching means has been operated, a content of the reproduction control information management means, and determining, when a content of an operation indication is for a presentation switch to a parent information block, if there is a parent information block to which transfer from the information block currently being presented is possible, and when a content of an operation indication is for a presentation switch to one of a preceding information block and following information block, if the information block currently being presented is part of the linkage, wherein when the determination result of the determination unit is affirmative, the reproduction control means retrieves an appropriate information block from the information storage means and presents it.

6. The multimedia presentation device of claim 1, further comprising information retrieval means for retrieving an information block and control information from the information storage means and sending the retrieved information block and the retrieved control information to the information reproduction means and the reproduction control information management means, wherein the information retrieval means includes:
  a read head unit for accessing the information storage means and retrieving information blocks and control information;
  a communication line for carrying a communication signal to the information reproduction means and the reproduction information control management means; and
  a communication control unit for transmitting the retrieved information block and the retrieved control information to the information reproduction means and the reproduction information control management means, according to a fixed communication method.

7. The multimedia presentation device of claim 6, the information storage means stores an automatic default condition for each parent information block which has a child information block which can be automatically defaulted, and the reproduction control information management means includes:
  discharge condition storage unit for retrieving an automatic default condition from the information storage means and storing it; and
  set time rewriting unit for referring, when a new information block reproduced by the information reproduction means has a child block which can be automatically defaulted to an automatic default condition stored by the storage unit and rewriting a set time of the operation time management means.

8. The multimedia presentation device of claim 7, wherein the information blocks have a main route for tracing a course by means of automatic discharging between upper level information blocks and lower level information blocks.

9. The multimedia presentation device of claim 6, wherein the information storage means stores automatic discharge order data, for each parent information block which has a number of child information blocks which can be automatically discharged, said automatic discharge order data showing which child information block should be retrieved next by means of automatic discharge, and the reproduction control information management means includes:
  a discharge order storage unit for retrieving the automatic discharge order data from the information storage means and storing it; and
  a next information block indication unit for referencing, when during reproduction an information block is to be automatically discharged, a content of the discharge order storage unit and indicating to the reproduction control means a next information block to be reproduced.

10. The multimedia presentation device of claim 6, wherein the groups of information blocks each include at least one route made up of a grouping of information blocks which are to be automatically reproduced in a decided order which does no depend on any operation by the user;

the reproduction control information management means retrieves information relating to the route from the information storage means and stores it;

the indication input means includes a presentation switching operation unit for switching from an information block currently being presented to one of a preceding information block, a following information block, and a parent information block; and the reproduction control means contains a determination unit for referencing, once the presentation switching means has been operated, a content of the reproduction control information management means, and determining, when a content of an operation indication is for a presentation switch to a parent information block, if there is a parent information block to which transfer from the information block currently being presented is possible, and when a content of an operation indication is for a presentation switch to one of a preceding information block and following information block, if the information block currently being presented is on the route, wherein when the determination result of the determination unit is affirmative, the reproduction control means retrieves an appropriate information block from the information storage means and presents it.

11. An editing device which enables a user to interactively change a presentation order of presentation information which is made up of multimedia data, said editing device comprising:

scene link management information storage means for storing scene link management information made up of link relation information showing which scenes are connected and link type information;

editing information temporary storage means for retrieving the scene link management information from the scene link management information storage means and temporarily storing the scene link management information as edited scene link management information:

input means for receiving an editing request input from an input device, such as a mouse;

editing control means for converting the edited scene link management information stored by the editing information temporary storage means, based on a type two editing request input from the input means;

scene link composition screen generation means for retrieving the edited scene link management information from the editing information temporary storage means, and, in addition to generating a scene figure for expressing a scene as a simplified figure and a scene link line figure for expressing a link between scenes as a line figure, for deciding, based on the edited scene link management information, a format of the scene figure and the scene link line figure and a display position of the scene figure and the scene link figure, thereby generating a scene link composition screen in which at least one scene figure is connected by a scene link line figure; and display output means for outputting the scene link composition screen generated by the scene link composition screen generation means to an output device.

12. The editing device of claim 11, wherein the scene link management information is a table which records, for any given scene, scene identifiers for any scenes which are linked to said given scene and information which shows that a relationship linking scenes is one of a parent-child and a sibling relationship, and the editing control means includes a rewriting unit for rewriting at least one of an appropriate scene identifier and an appropriate relationship in the mid-editing scene link management information stored by the editing information temporary storage means, in accordance with a type one editing request input.

13. The editing device of claim 12, wherein the scene link composition screen generation means includes:

a judgement unit for referencing the mid-editing scene link management information in the editing information temporary storage means and judging what kind of relationship a scene to be drawn has with a scene which has already been drawn; and a drawing position deciding unit for deciding a drawing position of a simplified figure for a next scene by setting coordinates of a next drawing position so that the scene to be drawn is displaced at a fixed distance with regard to the scene already drawn in one of main axes, when a judgement result is a sibling relationship, and by setting coordinates of a next drawing position so that the scene to be drawn is displaced at a fixed distance with regard to the scene already drawn in both of main axes, when a judgement result is a parent-child relationship.

14. The editing device of claim 13, wherein the scene link management information storage means, in addition to storing the link relation information showing which scenes are connected and the link type information, also stores scene level information which describes interlevel relationships between scenes connected on different levels, and the scene link composition screen generation means further includes:

a scene detection unit for detecting scenes which have a sub level, out of the mid-editing scene link management information retrieved from the editing information temporary storage means; and a scene representation figure generation unit for generating, for a detected scene with a sub level, a scene representation figure which is to be displayed in place of all scenes on sub levels.

15. The editing device of claim 14, wherein the scene link composition screen generation means further includes:

a drawing selection unit for having the scene representation figure generation unit process, when the scene detection unit detects a number of identical scenes with a sub level, all but one of the identical scenes, and for having one remaining scene processed by the judgement unit and drawing position deciding unit so that the one remaining scene is drawn with all scenes on sub levels represented by simplified figures; and identification mark generation means for displaying scenes out of the identical scenes with a sub level whose sub level is represented by a scene representation figure with different identification marks to a scene out of the identical scenes with a sub level whose sub levels are represented by simplified figures, with an identification mark being positioned next to each respective scene.

16. The editing device of claim 15, wherein the input means receives a selection indication from the user for selecting which of the identical scenes having a sub level is to be displayed with all of its sub levels represented by simplified figures; and the scene link composition screen generation means further includes a drawing selection control unit for controlling the drawing selection unit, according to a selection indication received by the input means, so as to always display a scene with a sub level indicated by the selection indication with all of its sub levels represented by simplified figures, and for having other identical scenes displayed with their sub levels represented by scene representation figures.

17. The editing device of claim 11, further including:

scene information storage means for storing source data made up of video, audio, graphics, text and suchlike and scene composition information for composing a scene out of the source data; and scene editing screen generation means for retrieving scene composition information from the scene information storage means via the editing information temporary storage means and, in addition to generating a scene editing screen for editing scenes, for retrieving the mid-editing scene link management information from the editing information temporary storage means and for generating a list screen of scenes which are linked to a present screen, based on the mid-editing scene link management information, before overwriting the list screen on one area of the scene editing screen, wherein the scene editing screen generated by the scene editing screen generation means is outputted to the display output means.

18. The editing device of claim 17, wherein the display output means includes a selection unit for alternatively outputting scene link composition screen and the scene editing screen which are inputted into the display output means, wherein the selection unit is operated by means of the input means.

19. An editing device which enables a user to interactively change a presentation order of presentation information which is made up of multimedia data, said editing device comprising:

scene information storage means for storing scene information including source data, made up of video, audio, graphics, text and suchlike, and scene composition information for composing a scene out of the source data;

scene link management information storage means for storing scene link management information made up of link relation information showing which scenes are connected and link type information, as well as scene level information for describing an inter-level relationship for scenes linked on different levels;

editing information temporary storage means for retrieving the scene link management information from the scene link management information storage means and temporarily storing the scene link management information as edited scene link management information;

input means for receiving an editing request input from an input device, such as one of a mouse and a keyboard;

editing control means for converting the edited scene link management information stored by the editing information temporary storage means based on a type one editing request input from the input means, and for converting the scene link management information stored by the storage means to the edited scene link management information stored by editing information temporary storage means, based a type two editing request input from the input means;

scene information retrieval means for retrieving the scene information from the scene information storage means and the scene link management information from the editing information temporary storage means;

scene reproduction screen generation means for generating a scene reproduction screen for reproducing a scene, based on the scene information retrieved by scene information retrieval means;

scene link composition screen generation means for generating a scene figure for expressing a scene as a simplified figure and a scene link line figure for expressing a link between scenes as a line figure, based on the scene link management information retrieved by the scene information retrieval means and for deciding, based on the scene link management information, a format of the scene figure and the scene link line figure and a display position of the scene figure and the scene link line figure, as well as expressing any scenes which have a sub level as scene representation figures and storing a display status for each of the scenes which have a sub level, so that when a same scene with a sub level is simultaneously displayed several times, sub levels belonging to one of the same scenes are displayed and remaining same scenes have their sub levels represented by scene representation figures, thereby generating a scene link composition screen in which at least one scene figure is connected by a scene link line figure, at a same time retrieving information for a scene to be reproduced from the scene information retrieval means and, based on the scene link composition screen, visually changing a scene figure and a scene link line figure corresponding to the scene to be reproduced by the scene reproduction screen generation means; and display output means for outputting the scene link composition screen generated by the scene link composition screen generation means and the scene reproduction screen generated by the scene reproduction screen generation device to an output device.

20. An editing device for editing a combination of multimedia data, such as video, static images, text and sound, to be reproduced simultaneously, the editing device comprising:

data storage means for storing the multimedia data and data related information;

data retrieval means for retrieving one of the multimedia data and data related information, such as reproduction time, from the data storage means;

period information storage means for storing time period information specifying a reproduction time for each reproduction of multimedia data;

data information storage means for storing a channel number, a period number and an address showing a position where a piece of data is stored in the data storage means;

data indication means for indicating a portion of data, out of the multimedia data stored by the data storage means, which is to be used as editing object data;

time period indication means for indicating a reproduction time period of the newly indicated editing object data;

channel indication means for indicating a channel for reproduction of the newly indicated editing object data;

editing information control means for storing in the data information storage means the reproduction time period indicated by the time period indication means, the channel indicated by the channel indication means and an address of the editing object data indicated by the data indication means, for retrieving a data reproduction time for the editing object data indicated by the data indication means from the data retrieval means and a period time of a time period indicated by the period indication means from the period information storage means, before comparing the data reproduction time and the period time, and for converting, when the data reproduction time is longer than the period time, an appropriate period time in the period information storage means to a value of the data reproduction time, in other cases leaving the period time as it is;

editing information display means for processing information for visually displaying editing information for the multimedia data, based on a content of the period information storage means and on a content of the data information storage means, when a content of one of the period information storage means and the data information storage means is updated by the editing information management means;

reproduction indication input means for inputting an indication for reproducing edited multimedia data;

reproduction control means for retrieving, once a reproduction indication is inputted into the reproduction indication input means, appropriate data from the data storage means based on an address stored by the data information storage means, in accordance with the period information stored by the period information storage means;

image data display means for processing image data to be displayed in the data retrieved by the reproduction control means; and audio data output means for processing audio data to be outputted in the data retrieved by the reproduction control means.

21. The editing device of claim 20, wherein the data information storage means stores, in addition to a channel number, a period number, and an address showing a position where data is stored in the data storage means, a reproduction base time which is a necessary time for one reproduction of one portion of data, the editing information management means stores the data reproduction time, which is one portion of the data related information retrieved by the data retrieval means, as the reproduction base time in the data information storage means, the editing information display means processes editing information for display by changing, when a reproduction base time in the data information storage means is set a fixed value beforehand, a period time of an appropriate time period to a reproduction time, and the reproduction control means controls, when a reproduction base time in the data information storage means is set a fixed value beforehand, a change of a period time for an appropriate time period to the reproduction time.

22. The editing device of claim 21, wherein the data information storage means also stores a remaining time process number, the editing information control means stores a remaining time process number, which is one portion of the data related information retrieved by the data retrieval means, in the data information storage means, the editing information display means processes information for displaying a display pattern corresponding to a remaining time process number which is set beforehand for a display area for any remaining time after expiration of a reproduction base time during a period time, the image data display means processes image data using a predetermined method in accordance with a remaining time process number as a reproduction process for any remaining time after expiration of a reproduction base time during a period time, and the audio data output means processes audio data using a predetermined method in accordance with a remaining time process number as a reproduction process for any remaining time after expiration of a reproduction base time during a period time.

23. A multimedia data presentation device that successively reproduces information blocks which are composed of multimedia data that is made up of a combination of at least image information, audio information, and at least two button media which are used to receive a user indication, the multimedia data presentation device comprising:

information storage means for storing the information blocks and sets of information block reproduction control information, wherein each set of information block reproduction control information corresponds to a different information block, and each set of information block reproduction control information showing a next information block to be reproduced corresponding to each of button media in a present information block, button media reproduction time period information showing a reproduction time period for all of the button media in the present information block during which a user indication can be received, and an automatic discharge condition for automatically selecting one of the button media in the present information block that is determined when the reproduction time period for the button media has elapsed;

information retrieval means for retrieving an information block to be reproduced and a corresponding set of information block reproduction control information from the information storage means;

indication input means for receiving a user indication;

operation time management means for determining whether the indication input means has received a user indication within the reproduction time period for a button medium corresponding to a next information block, in accordance with the button media reproduction control information corresponding to the present information block;

automatic button selection means for automatically selecting a button medium corresponding to an information block to be reproduced next in accordance with the automatic discharge condition in the set of information block reproduction control information corresponding to the present information block;

information block reproduction means for determining, when the user indication has been given within the reproduction time period for the button media, an information block corresponding to a button medium indicated by the user indication as a next information block to be reproduced, and determining, when no user indication has been given within the reproduction period for the button media, an information block corresponding to the button medium automatically selected by the automatic button selection means as a next information block to be reproduced; and information output means for decoding an information block and outputting decoded data.

* * * * *